United States Patent Office 3,660,398
Patented May 2, 1972

3,660,398
PREPARATION OF QUINOXALINE-
DI-N-OXIDES
Kurt Ley, Leverkusen, and Ulrich Eholzer, Roland Nast, and Florin Seng, Cologne, Germany, assignors to Farbenfabriken Bayer Aktiengesellschaft, Leverkusen, Germany
No Drawing. Continuation of application Ser. No. 631,893, Apr. 19, 1967. This application Apr. 7, 1970, Ser. No. 24,422
Int. Cl. C07d 51/78
U.S. Cl. 260—250 R                 9 Claims

ABSTRACT OF THE DISCLOSURE

Quinoxaline-di-N-oxides, having pharmacological properties and usable as intermediates for producing plant protection agents, produced by reacting in an organic diluent (e.g. at 20–100° C.) benzofurazane-N-oxide (optionally substituted with halo, alkyl, alkoxy, acyl, substituted acyl, amido, substituted amido, sulfonamido, and/or substituted sulfonamido) with a reagent composed of either (a) at least an equivalent quantity of both an organic carbonyl compound (e.g. linear or cyclo aliphatic, aryl, or heterocyclic carbonyl compound) with is optionally substituted and which contains the linkage

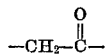

and a primary aliphatic amine or ammonia; or (b) at least an equivalent quantity of the corresponding Schiff's base to the reagent under (a).

---

This application is a continuation of application Ser. No. 631,893, filed Apr. 19, 1967.

It has now been found that quinoxaline-di-N-oxides, some of which compounds are new, may be obtained by reacting benzofurazane-N-oxides of the following general formula

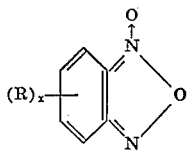

in which x represents 1 or 2,
R represents a hydrogen or halogen atom or an alkyl, alkoxy or carbalkoxy group or the radical

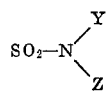

in which

Y denotes a hydrogen atom or a lower alkyl radical, and
Z denotes a hydrogen atom or a lower alkyl or cycloalkyl radical having 5 to 8 carbon atoms in the ring system, an aryl radical which may be substituted from one to three times by a lower alkyl or alkoxy radical or a halogen atom, or a heterocyclic radical, and in which, in addition, two of the radicals R may form a fused benzene ring, with at least an equimolar quantity both of a compound which contains a carbonyl group and which has a methylene or methyl group adjacent to the carbonyl group, and of a primary aliphatic amine or ammonia, or with at least the equivalent quantity of the corresponding Schiff's base, in an organic diluent at a temperature of from about 20 to about 100° C.

The radicals R are preferably alkyl radicals containing 1 to 16 carbon atoms, halogen atoms such as fluorine, chlorine or bromine or alkoxy groups or carbalkoxy groups containing 1 to 4 carbon atoms. The lower alkyl radicals Y and Z preferably contain 1 to 4 carbon atoms and the aryl radicals Z preferably contain up to 10 carbon atoms in the ring system. The aryl radical Z may be substituted by alkyl or alkoxy groups having, preferably, 1 to 4 carbon atoms, or by halogen atoms, in particular fluorine, chlorine and bromine. Heterocyclic radicals Z are preferably those which contain 6 ring members and 1 to 3 heteroatoms, especially oxygen, nitrogen or sulphur.

The following are examples of benzofurazane-N-oxides which may be used as starting compounds:

benzofurazane-N-oxide,
5-methyl-,
5-ethyl-,
5-propyl-,
5-butyl-,
4,6-dimethyl-,
4,6-diethyl-,
5-chloro-,
5-bromo-,
5-fluoro-,
5-methoxy-6-chloro-,
5-ethoxy-6-chloro-,
5,7-dibromo-,
5,7-dichloro-,
5-methoxy,
5-ethoxy-,
5-propoxy-,
5-butoxy-,
5-carbomethoxy-,
5-carbethoxy-,
5-carbopropoxy-,
5-carbobutoxy,
5-carbobenzoxy- and
5-sulphonamidobenzo-furazane-N-oxide,
5-sulphone-N-methyl-amido-,
5-sulphone-N,N-diethyl-amido-,
5-sulphone-N-cyclohexyl-amido-,
5-sulphone-N-methyl-N-cyclopentyl-amido-,
5-sulphone-anilido-,
5-sulphone-(4-methylanilido)-,
5-sulphone-(4-methoxyanilido)-,
5-sulphone-(3-methoxy-4-chloroanilido)-,
5-sulphone-(2-amino-pyridino)-,
5-sulphone-(2-aminopyrimidino)-,
5-carbamido-,
5-carbanilido-,
5-carbo-(4-methylanilido)-,
5-carbo-(4-methoxy-anilido)-,
5-carbo-(3-methyl-4-chloro-5-bromo-anilido)-,
5-carbo-(2-amino-pyridino)- and
5-carbo-(2-amino-pyrimidino)-benzofurazane-N-oxide, and
1,2-naphthofurazane-N-oxide.

The following are preferred examples of compounds containing a carbonyl group which may be used in the process according to the invention. Symmetrical and asymmetrical dialkyl ketones containing a total of up to 20 carbon atoms in the alkyl groups, which alkyl groups may also carry as substituents an aliphatic acyl radical (preferably having 1 to 4 carbon atoms), a benzoyl radical or a dialkylamino group (preferably 1 to 4 carbon atoms per alkyl radical), and in the case of said dialkylamino radical, the alkyl groups may together with the nitrogen atom which joins them form part of a 5- or 6-membered heterocyclic radical which may contain oxygen or sulphur as an additional heteroatom; and aliphatic-aromatic ketones containing up to 4 carbon atoms in the alkyl radical and up to 10 carbon atoms in the aromatic ring system which may, if desired, be substituted which ketones may also contain a CN group as substituent in the aliphatic radical, suitable groups by which the aromatic ring may be substituted being lower alkyl radicals and lower alkoxy groups having 1 to 4 carbon atoms, and the halogen fluorine, chlorine and bromine. Other carbonyl compounds which may be used in the process according to the invention are cycloaliphatic ketones containing 5 to 12 and preferably 5, 6, 7, 8, 10 or 12 carbon atoms in the ring system and α-, β- and γ-ketocarboxylic acids (preferably containing 3 to 5 carbon atoms in the carboxylic acid radical) and their derivatives such as esters (preferably with aliphatic alcohols containing 1 to 6 atoms, phenols and cycloalkanols containing 5 or 6 carbon atoms in the ring system), amides, mono- and dialkyl amides (having 1 to 18, preferably 1 to 12 carbon atoms per alkyl group), which alkyl radicals may, in the case of dialkylamides, also be constituents of a 5- or 6-membered heterocyclic ring system which may contain, in addition to the amidonitrogen, another hetero atom such as nitrogen, oxygen or sulphur, preferably in the paraposition in the case of a 6-membered ring. Particularly suitable keto carboxylic acid derivatives are the substituted or unsubstituted monoarylamides (preferably containing up to 10 carbon atoms in the aromatic ring which in turn may contain up to 3, but preferably not more than two substituents such as alkyl (preferably having 1 to 4 carbon atoms) or alkoxy (preferably 1 to 4 carbon atoms) groups, halogen atoms (preferably fluorine, chlorine, bromine) or an azobenzene radical), in which monoarylamides the aromatic radical may be further fused to a 5- or 6-membered heterocyclic ring system containing a maximum of three nitrogen atoms as hetero atoms, as well as the corresponding aryl-, alkyl- (preferably 1 to 6 carbon atoms) or cycloalkylamides (preferably 5 or 6 carbon atoms). In the case of N-mono-substituted amides, the substituent may in addition be a 5- or 6-membered heterocyclic radical which may be fused to a benzene ring. This heterocyclic radical may advantageously contain one or two nitrogen atoms, or one nitrogen atom, and one oxygen or sulphur atom, or only one oxygen or sulphur atom alone. Furthermore, in the case of monoketocarboxylic acid amides, the substituent may also be a benzenesulphonyl radical which may be substituted and which preferably carries as ring substituent a lower alkyl radical (preferably 1 to 3 carbon atoms). One may also use ketocarboxylic acid amides which have been obtained by reacting 2 mols of an α-, β- or γ-ketocarboxylic acid with one mol of a suitable bifunctional amine. Other suitable ketocarboxylic acid derivatives are the nitriles or hydrazides which may if desired be substituted by phenyl or lower alkyl radicals (preferably with 1 to 4 carbon atoms), in which case the two alkyl radicals on one nitrogen atom may form a heterocyclic ring preferably containing 6 ring members, which may contain oxygen as an additional hetero atom, preferably in the para-position to the ring nitrogen. Further types of "carbonyl compounds" which may be used in the process according to the invention are ketoaldehydeacetals (preferably containing 1 to 4 carbon atoms in the keto residue and 1 to 3 carbon atoms in the alcohol residue); carbonyl compounds substituted by any oximino group in the position adjacent to the keto group; 5- or 6-membered heterocyclic carbonyl compounds containing 1 to 2 hetero atoms, preferably oxygen and tertiary nitrogen atoms and steroid ketones.

The following are particular examples of the above-mentioned compunds containing a carbonyl group:

acetone,
methyl-ethyl-,
methyl-propyl-,
methylisopropyl-,
methylisobutyl-,
methyl-tertiary butyl-,
methylvinyl-,
ethylvinyl-,
methylpropenyl-, and
propylvinylketone-,
2-methyl-(2)-pentenone-4-(mesityl oxide) and
2-methyl-2-heptenone-(6);
methylbutyl-,
methyl-n-amyl-,
methylhexyl-,
methylheptyl-,
methyloctyl-,
methylnonyl-,
methyldecyl-,
methylundecyl-,
methyldodecyl-,
methyltridecyl-,
methyltetradecyl-,
methylpentadecyl-,
methylhexadecyl- and
methylheptadecyl ketone;
diethylketone,
ethylpropyl-,
ethylbutyl-,
ethylamyl-,
ethyl-hexyl-,
ethyloctyl-,
ethyldecyl-,
ethylhexadecyl ketone;
dipropylketone,
dibutyl-,
diamyl-,
dihexyl-,
diheptyl-,
dioctylketone-,
cyclopentanone-,
cyclohexanone,
cycloheptanone,
cyclooctanone,
cyclodecanone,
cyclododecanone,
4-methyl-cyclohexanone,
actophenone,
propiophenone,
4-methoxy-acetophenone,
4-chloroacetophenone,
4-methylpropiophenone and
4-aceto-diphenyl;
ethylacetoacetate,
α-ketoethane-dicarboxylic acid diethylester,
aceto-3,4-dichloroanilide,
aceto-2-chloroanilide,
aceto-2-methoxyanilide,
aceto-4-methoxy-anilide,
aceto-2,5-dimethoxy-anilide,
aceto-2,5-dimethoxy-4-chloro-anilide,
aceto-2-methyl-4-chloro-anilide,
aceto-2-methylanilide,
aceto-2,4-dimethyl-anilide,
aceto-4-sulphamidoanilide,
aceto-azobenzamide,
acetopyrrolidide,
aceto-piperidine,
aceto-n-dodecylamide,
N-morpholine-acetamide,
O-phenylacetate,
aceto-N-2-(4-methyl-pyrimidino)-amide,
aceto-(2-benzothiazolyl)-amide,
aceto-N-5-(2-phenyl-benzo-1,2,3-triazolyl)-amide,
aceto-N-2-(pyridino)-amide,
aceto-2,6-dimethylanilide,
aceto-cyclohexylamide,
pyruvic acid,
acetylacetone,
1-morpholino-butanone-3, 1-phenyl-1-cyano-pentanone-4,
benzoylpropionic acid,
cis-decal-one-2,
2-oximino-pentanone-3,
2-oximino-cyclodecanone-1,
laevulinic acid,
laevulinic acid amide,
laevulinic acid anilide,
laevulinic acid-3,4-dichloroanilide,
laevulinic acid-N-n-butylamide;
ethyl stearoylacetate,
pyruvic acid amide,
acetylacetaldehyde-O,O-dimethyl- or
dibutyl-acetal,
N-methylpyrrolidone,
camphor,
2-cyclohexylidene-butyric acid N-2-thiazoylamide,
N,N'-acetoacetyl-piperazine,
dihydro testosterone,
progesterone and
corticosterone.

The class of compounds containing carbonyl groups which can be used for the process according to the invention includes aldehydes, in particular those of the general formula $$A-CH_2-\underset{\underset{H}{|}}{C}=O$$

in which

A represents a hydrogen atom or an aliphatic hydrocarbon radical which may be substituted by one or two hydroxyl groups or by an aryl radical which may be substituted by one or two lower alkyl or lower alkoxy radicals, or halogen atoms; and A may also represent an aromatic radical containing up to 14 carbon atoms in the ring system, which aryl radical may be substituted or a 5- or 6-membered heterocyclic radical.

Apart from hydrogen atoms, the following are preferred examples of radical A: Straight chained or branched aliphatic hydrocarbon radicals containing up to 16 carbon atoms, which radicals may contain up to 2 double or triple bonds, and cycloaliphatic radicals having 3 to 12 and preferably 3, 5, 6, 7, 8, 10 or 12 carbon atoms in the ring system. The aromatic substituent (preferable phenyl or naphthyl) which may be attached to the aliphatic hydrocarbon radical may be substituted by lower alkyl or alkoxy groups preferably those having 1 to 4 carbon atoms, or by halogen is preferably fluorine, chlorine or bromine.

Preferred examples of aromatic radicals A, which may be substituted, are phenyl, naphthyl, anthracenyl and phenanthrenyl. These aromatic radicals may if desired carry up to 3, preferably 1 or 2 identical or different substituents such as alkyl containing 1 to 4 carbon atoms, alkoxy containing 1 to 4 carbon atoms, halogen (fluorine, chlorine, bromine or iodine) and lower perhalogenoalkyl radicals having preferably 1 or 2 carbon atoms, and fluorine or chlorine as the halogen atoms.

The 5- or 6-membered heterocyclic radicals may contain as a maximum of 3 nitrogen atoms as their hetero atoms, although one may also use heterocyclic ring systems which contain an oxygen or sulphur atom in addition to one or two nitrogen atoms, or which contain only one oxygen or sulphur atom as their sole hetero atoms.

The following are examples of such aldehydes: acetaldehyde, propionaldehyde, n-butyraldehyde, valeric aldehyde, caproic aldehyde, oenanthoic aldehyde, caprylic aldehyde, pelargonic aldehyde, capric aldehyde, undecanal, lauric aldehyde, tridecanal, myristic aldehyde, palmitic aldehyde, stearic aldehyde, 3-hydroxy-butyraldehyde, 3-phenyl-propionaldehyde, 4-methyl-phenylacetaldehyde, piperidino-acetaldehyde, 3-indolyl-acetaldehyde and 2-pyridino-acetaldehyde.

An primary amine, preferably an aliphatic amine or, in particular, ammonia, may be used for carrying out the process according to the invention. Because they are easier to work up and recover, inexpensive short-chained, water-soluble amines such as methylamine, propylamine, n-butylamine and cyclohexylamine, and ammonia are preferably used, i.e. lower aliphatic, e.g., lower alkyl, or $C_{5-8}$ cycloaliphatic, e.g., $C_{5-8}$ cycloalkyl, primary amines.

The process according to the invention will be explained with the aid of the following examples:

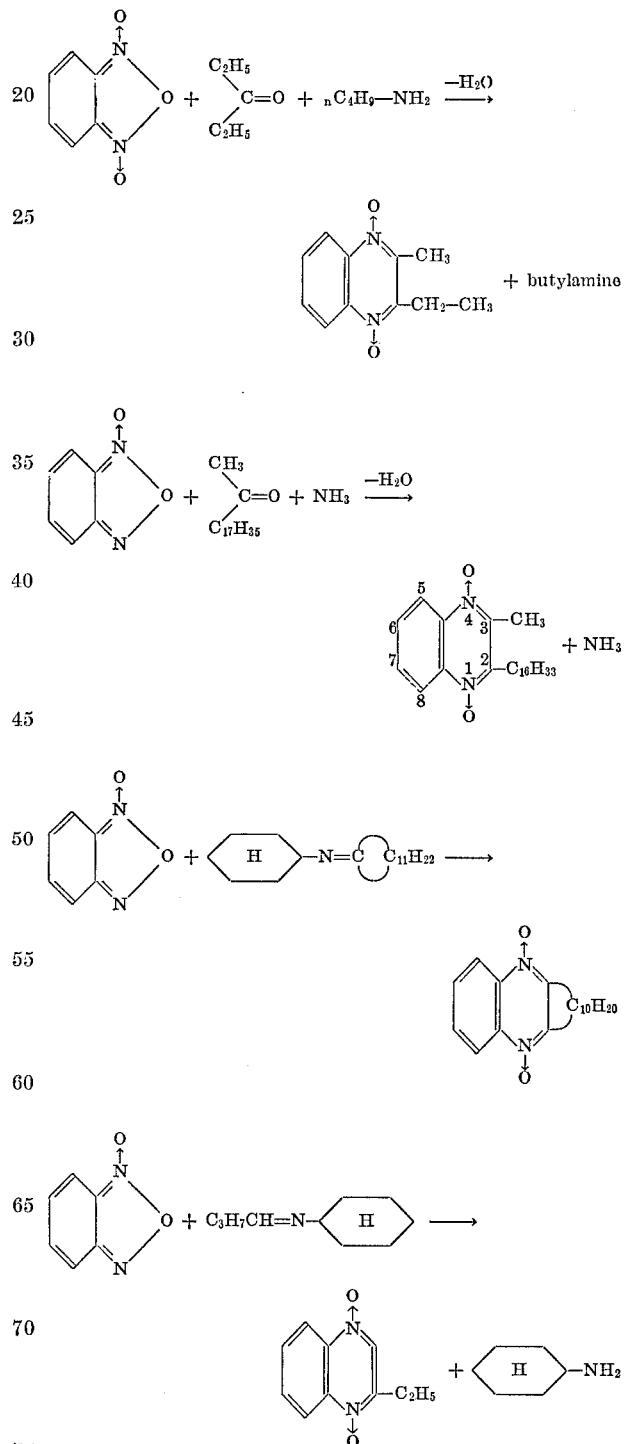

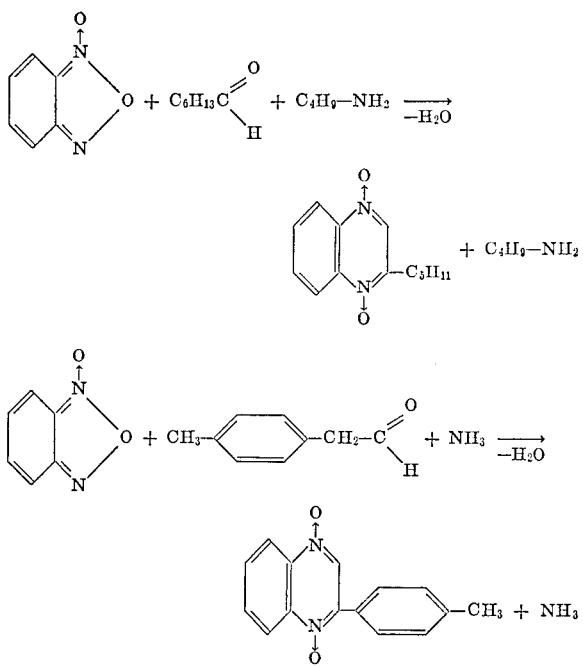

The reaction is carried out using organic diluents or solvents such as alcohols (in particular those with 1 to 5 carbon atoms such as lower alkanols), lower aliphatic nitriles such as acetonitrile, dilower alkyl formamides such as dimethyl formamide, benzene, toluene, i.e., aromatic hydrocarbons, petroleum ether fractions, and the like. One may also, if desired, use the carbonyl compound both as reactant and as solvent.

As a general rule, the carbonyl compound and benzofurazane-N-oxide are placed in a solvent, and the amine or ammonia is then either run in or introduced dropwise as the case may be. Alternatively, the benzofurazane-N-oxide and amine or ammonia may be placed in the reaction vessel and the carbonyl compound then added to the reaction mixture. In some cases it may be advantageous to use an excess of carbonyl compound. Where Schiff's bases are used, they are run into the dissolved benzofurazane.

One uses at least the equimolar quantity of carbonyl compound and at least the equimolar quantity of primary aliphatic amine or ammonia or, instead of the individual components, at least the equimolar quantity of a corresponding Schiff's base, for each mol of benzofurazane-N-oxide. The carbonyl compound is preferably used in the reaction in a quantity of about 1.0 to about 1.5 mol in particular 1.0 to 1.1 mol; the primary aliphatic amine or ammonia preferably is used in a quantity of about 1.1 to 3.0 mol and in the case of ammonia it is particularly advantageous that one should use about 2 to 3 mols. Where free ketocarboxylic acids are used, this quantity of amine is increased by an amount equivalent to the acid. In this case $CO_2$ is split off. If an acetoacetic acid phenylester is used, phenol is split off and the corresponding carbonamide is formed. In the case of a monofunctional acetoacetic acid lower alkylester no secondary reaction occurs while a bifunctional lower alkylester forms the corresponding diamide. Where a Schiff's base is used, this is also used in the reaction in a quantity of about 1.0 to 1.5 mol and if desired up to about 2 mols.

The reaction is carried out at a temperature of from about 20 to about 100° C., preferably between 30 and 70° C. The quinoxaline-di-N-oxides formed in the reaction usually separate in crystalline form during the course of the reaction and are isolated by the usual methods. The following quinoxaline-di-N-oxides are examples of compounds which can be prepared by the process according to the invention:

2-methyl,
2,3-dimethyl,
2-methyl-3-ethyl-,
2-ethyl-3-propyl-,
2-methyl-3-propyl-,
2-methyl-3-hexyl-,
2-methyl-3-heptyl-,
2,3-cyclodecylene,
2-methyl-3-decyl,
2-methyl-3-hexadecyl-,
2-methyl-7-chloro-,
2,3-dimethyl-7-chloro-,
2-methyl-3-ethyl-7-chloro-,
2-methyl-3-propyl-7-chloro-,
2-methyl-3-hexyl-7-chloro,
2-methyl-3-heptyl-7-chloro-,
2-methyl-3-decyl-7-chloro-,
2-methyl-3-hexadecyl-7-chloro-,
2,3-cyclodecylene-7-chloro-,
2,3-cyclodecylene-7-methyl-,
2,3-cyclodecylene-7-ethoxy-,
2,3-dimethyl-7-bromo-,
2-methyl-3-ethyl-5,7-dibromo-,
2-methyl-3-hexadecyl-5,7-dibromo-,
2,7-dimethyl-,
2,3,7-trimethyl-,
2,7-dimethyl-3-ethyl-,
2-methyl-7-methoxy-,
2,3-dimethyl-7-methoxy-,
2-methyl-3-decyl-7-methoxy-,
2-methyl-3-hexadecyl-7-methoxy-,
2-methyl-7-ethoxy,
2,3-dimethyl-7-ethoxy-,
2-methyl-3-ethyl-7-ethoxy-,
2-methyl-3-decyl-7-ethoxy-,
2-methyl-3-hexadecyl-7-ethoxy,
2,3-dimethyl-7-carbomethoxy-,
2-methyl-3-ethyl-7-ethoxycarbonyl-,
2-methyl-3-hexadecyl-7-ethoxycarbonyl,
2,3-dimethyl-7-(4-toluene-sulphonamido)-,
2-methyl-3-ethoxy-carbonyl-,
2-methyl-3-ethoxycarbonyl-7-chloro- or
2-methyl-3-ethoxycarbonyl-7-ethoxyquinoxaline-di-N-oxide.

Compounds which may be obtained from aldehydes are:

quinoxaline-di-N-oxide,
2-methyl-,
2-ethyl-2-n-pentyl-,
2-benzyl-,
2-(4-methyl-phenyl)-,
2,6-dimethyl-,
2-ethyl-6-methyl-,
2-n-pentyl-6-methyl-,
2-(4-methylphenyl)-6-methyl-,
2-methyl-6-methoxy-,
2-ethyl-6-methoxy-,
2-n-pentyl-6-methoxy-,
2-(4-methylphenyl)-6-methoxy-,
2-ethyl-6-chloro-,
2-n-pentyl-6-chloro-,
2-(4-methylphenyl)-6-chloro-,
2-methyl-3-hexadecyl-7-ethoxy,
2-ethyl-6-ethoxy-,
2-n-pentyl-6-ethoxy-,
2-(4-methylphenyl)-6-ethoxy-,
2-(4-methylphenyl)-6-methoxy-carbonyl-,
2-(4-methyl-phenyl))-6-sulphonamide-,
2-(1'-hydroxyethyl)-6-chloro and
2-methyl-5,7-dichloro-quinoxaline-di-N-oxide.

Some of the compounds obtainable by the process according to the invention are new and are valuable intermediate products for use in the preparation of plant protective agents.

EXAMPLE 1

136 g. (1 mol) of benzofurazane-N-oxide are dissolved in 450 cc. of acetone. 73 g. (1 mol) of butylamine are added dropwise at 20 to 30° C. and the reaction mixture is stirred for 5 hours at room temperature. After it has cooled to about 5° C., the product which has crystallised out is separated by filtration under suction and washed with methanol. 77 g. (=43.6% of the theoretical) of 2-methylquinoxaline-di-N-oxide of the following formula

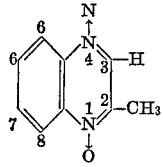

are obtined as pale yellow crystals which melt at 181° C. after recrystallisation from alcohol.

Analysis.—$C_9H_8N_2O_2$ (mol. wt. 176). Calculated (percent): C, 61.30; H, 4.54; N, 15.91; O, 18.19. Found (percent): C, 61,21; H, 4.68; N, 15.98; O, 18.22.

EXAMPLE 2

(a) 136 g. (1 mol) of benzofurazane-N-oxide are dissolved in 500 cc. of methanol and 86.5 g. (1.2 mol) of methyl ethyl ketone and 119 g. (1.2 mol) of cyclohexylamine are added dropwise at 20–30° C. The reaction mixture is then stirred for another 5 hours at 30° C. and cooled with ice water and the product which has crystallised out is separated by filtration under suction. 140 g. (=73.5% of the theoretical) of 2,3-dimethyl-quinoxaline-di-N-oxide is obtained in the form of pale yellow crystals which melt at 188–189° C. (with decomposition) after recrystallisation from ethanol.

Analysis.—$C_{10}H_{10}N_2O_2$ (mol. wt. 190). Calculated (percent): C, 63.20; H, 5.26; N, 14.74; O, 16.85. Found (percent): C, 62.01; H, 5.29; N, 14.65; O, 16.88.

(b) 204 g. (1.5 mol) of benzofurazane-N-oxide together with 118 g. (1.64 mol) of methyl ethyl ketone are dissolved in 700 cc. of methanol at 50° C. Ammonia is then passed in for 8 hours and the temperature is maintained between 50 and 55° C. by occasionally cooling the reaction mixture. The reaction mixture is then cooled and the crystals which have separated are removed by filtration under suction. 260 g. (=91.5% of the theoretical) of 2,3-dimethyl-quinoxaline-di-N-oxide are obtained in the form of yellow crystals of melting point 188 to 189° C., which crystals show no lowering of melting point over the comopund obtained according to (a).

EXAMPLE 3

(a) 68 g. (0.5 mol) of benzofurazane-N-oxide are dissolved in 150 cc. of diethylketone, and 73 g. (1 mol) of butylamine is added dropwise with cooling at 30 to 35° C. The product crystallises out after 30 minutes. The reaction mixture is diluted with 100 cc. of a light fraction of petroleum ether and the reaction mixture is then stirred for 2 hours at 30 to 40° C. After removal by filtration under suction and washing with light petroleum ether, 86 g. (=84% of the theoretical) of 2-methyl-3-ethyl-quinoxaline-di-N-oxide are obtained as pale yellow crystals which melt at 141 and 142° C. after recrystallisation from ethanol.

Analysis.—$C_{11}H_{12}N_2O_2$ (mol. wt. 204). Calculated (percent): C, 64.70; H, 5.89; N, 13.72; O, 15.68. Found (percent): C, 64.66; H, 5.79; N, 13.75; O, 15.72.

(b) 13.6 g. (0.010 mol) of benzofurazane-N-oxide are dissolved in 40 cc. of methylpropyl ketone. 8 g. (0.11 mol) of butylamine is added dropwise. The temperature is maintained at about 30° C. by cooling. Stirring of the reaction mixture is then continued for another 3 hours and the crystals which separate are isolated by filtration under suction. 18 g. (=88.5% of the theoretical) of pale yellow crystals are obtained which show no lowering of melting point over the compound prepared according to (a).

EXAMPLE 4

(a) 27.2 g. (0.20 mol) of benzofurazane-N-oxide are dissolved in 250 cc. of ethanol together with 39.6 g. of methyl undecyl ketone (0.20 mol.). 15 g. (0.20 mol) of butylamine are added dropwise to this mixture at 40° C. The temperature is maintained at 40° C. for one hour and the reaction mixture is then heated for one hour at 60° C. A crystalline paste is obtained on cooling. After removal of solvent by filtration under suction and washing with methanol, 50 g. (=79% of the theoretical) of 2-methyl-3-decyl-quinoxaline-di-N-oxide are obtained in the form of a pale yellow substance of melting point 111 to 113° C. Recrystallisation does not result in any improvement in the melting point.

Analysis.—$C_{19}H_{28}N_2O_2$ (mol. wt. 316). Calculated (percent): C, 72.0; H, 8.84; N, 8.84; O, 10.12. Found (percent): C, 71.8; H, 8.98; N, 8.89; O, 10.19.

(b) Ammonia is passed into a solution of the same composition as under (a) (3 to 4 hours) until a thick crystalline paste has formed. The temperature remains between 40 and 45° C. during this operation. After removal of solvent by filtration under suction, washing with ethanol and drying, 51 g. (=80.5% of the theoretical) of pale yellow crystals are obtained which melt at 111 to 113° C. and show no lowering of melting point over the compound obtained according to (a).

EXAMPLE 5

(a) 27.2 g. (0.20 mol) of benzofurazane-N-oxide are dissolved together with 56.4 g. (0.20 mol) of methylheptadecyl ketone in 250 cc. of ethanol at 40° C. 40.6 g. (0.20 mol) of butylamine are added dropwise to this mixture. The reaction mixture is kept at 45° C. for 2 hours and then heated for one hour at 60° C. One cooling, a crystalline paste forms after removal of solvent by filtration under suction followed by drying. 41.5 g. (=77% of the theoretical) of 2-methyl-3-hexadecyl-quinoxaline-di-N-oxide are obtained in the form of the pale yellow crystals, which melt at 111 to 113° C. after recrystallisation from ethanol.

Analysis.—$C_{25}H_{40}N_2O_2$ (mol. wt. 400). Calculated (percent): C, 75.0; H, 10.0; N, 7.0; O, 8.0. Found (percent). C, 75.28; H, 10.17; N, 6.92; O, 8.12.

(b) Ammonia is passed into a solution of the composition used in (a) at 40 to 45° C. until (after 3 to 4 hours) a thick crystalline paste has formed. After removal of solvent by filtration under suction and drying, 64 g. (=80% of the theoretical) of pale yellow crystas are obtained. The compound melts at 111 to 113° C. and shows no lowering of melting point over the compound obtained in (a).

EXAMPLE 6

27.2 g. (0.20 mol) benzofurazane-N-oxide and 100 cc. (excess acetophenone are dissolved in 100 cc. methanol. Ammonia is introduced over 4 hours at 40° C. The reaction mixture is left to stand overnight and the crystals which have separated out are removed by filtration under suction. 27 g. (=56.7% of the theoretical) of 2-phenyl-quinoxaline -di-N-oxide are obtained as pale yellow crystals of melting point 209 to 210° C.

Analysis.—$C_{14}H_{10}N_2O_2$ (mol. wt. 258). Calculated percent): C, 70.65; H, 4.21; N, 11.76. Found (percent): C, 70.6; H, 4.35; N, 11.7.

EXAMPLE 7

27.2 g. (0.20 mol) of benzofurazane-N- oxide are dissolved in 100 cc. of methanol. 35.6 g. (0.20 mol) of cyclohexylidenecyclohexylamine are added dropwise to this solution. The temperature is prevented from rising above 35° C. by periodically cooling the mixture. The reaction mixture is then stirred for one hour at this temperature, cooled, and separated from the precipitated crystals by filtration under section. 22 g. (=50.5% of the theoretical) of 2,3-cyclobutylene-quinoxaline-di-N-oxide of the following formula

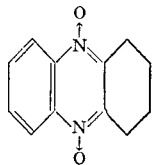

are obtained as pale yellow crystals of melting point 182–183° C.

*Analysis.*—$C_{12}H_{12}N_2O_2$ (mol. wt. 216). Calculated (percent): C, 66.70; H, 5.57; N, 12.97. Found (percent): C, 67.0; H, 5.6; N, 13.05.

EXAMPLE 8

(a) 68 g. (0.5 mol) of benzofurazane-N-oxide are dissolved in 400 cc. of ethanol at 50° C. together with 91 g. (0.5 mol) of cyclododecanone. 40 g. (0.505 mol) of butylamine are added dropwise. During this operation, the temperature of the reaction mixture rises to its boiling point. It is stirred for 2 hours at 60° C. cooled, and separated from the precipitated product by filtration under suction. 90 g. (=60% of the theoretical) of 2,3-cyclodecylene-quinoxaline-di-N-oxide of the compound of the following formula

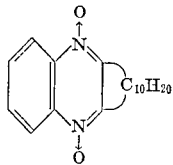

are obtained in the form of pale yellow crystals of melting point 132 to 133° C.

*Analysis.*—$C_{18}H_{24}N_2O_2$ (mol. wt. 300). Calculated (percent): C, 72.1; H, 8.0; N, 9.34. Found (percent): C, 71.8; H, 8.1; N, 9.38.

(b) 13.6 g. (0.10 mol) of benzofurazane are dissolved in 80 cc. of methanol. 24.2 g. (0.10 mol) of cyclododecylidene-cyclohexylamine (Schiff's base of cyclododecanone and cyclohexylamine) are added dropwise to this solution. The temperature rises to 50° C. during this operation. The reaction mixture is then stirred for one hour at this temperature, and after cooling and separation of a solvent by filtration under section, 18 g. (=60% of the theoretical) of crystals of melting point 132 to 133° C. are obtained which show no lowering of melting point over the compound prepared in (a).

(c) 27.2 g. (0.20 mol) of benzofurazane-N-oxide are dissolved in 150 cc. of methanol at 50° C. together with 36.4 g. (0.20 mol) of cyclododecanone. Ammonia is passed into the reaction mixture at this temperature. As the ammonia is added, the temperature drops to 40° C. Introduction of ammonia is continued for 3 hours, during which time a crystalline paste forms which is separated from solvent by filtration under suction and washed with methanol. The crystals melt at 132 to 133° C. They show no lowering of melting point over the compound prepared according to (a) or (b). The yield is 50 g. (=83.5% of the theoretical).

EXAMPLE 9

17 g. (0.10 mol) of 5-chlorobenzofurazane-N-oxide are dissolved in 50 cc. of acetone, and 9.5 g. (0.1 mol) of cyclohexylamine are added dropwise, with cooling, at 20 to 25° C. The reaction mixture is then stirred for 3 hours at 40° C. The crystals which separate out are filtered off under suction and recrystallised from methanol. 6 g. of 2-methyl-7-chloro-quinoxaline-di-N-oxide are obtained as pale yellow crystals which melt at 190 to 191° C.

*Analysis.*—$C_9H_7ClN_2O_2$ (mol wt. 210.5). Calculated (percent): C, 51.40; H, 3.33; N, 13.32; O, 15.25. Found (percent): C, 51.70; H, 3.65; N, 13.29; O, 15.35 (mol. wt. 211).

EXAMPLE 10

(a) 34.1 g. (0.20 mol) of 5 - chlorobenzofurazane-N-oxide are dissolved in 100 cc. of methylethyl ketone, and 16 g. (0.22 mol) of butylamine are added dropwise at 40 to 50° C.). A thick crystalline paste separates. 100 cc. of light petroleum ether are added to dilute the reaction mixture, and the mixture is then stirred for one hour at 50° C. After filtration under suction and washing with methanol, 41 g. (=90% of the theoretical) of 2,3-dimethyl - 7 - chloroquinoxaline-di-N-oxide are obtained in the form of pale yellow crystals which melt at 175 to 176° C. after recrystallisation from methanol.

*Analysis.*—$C_9H_9ClN_2O_2$ (mol. wt. 225). Calculated (percent): C, 53,50; H, 4.02; Cl, 15.79; N, 12.47; O, 14.25. Found (percent): C, 53.52; H, 4.16; Cl, 15.80; N, 12.40; O, 14.22.

(b) The same compound as obtained in (a) is obtained by the introduction of ammonia for 4 hours into a methanolic solution of 5 - chlorobenzofuroxane-N-oxide and methyl ethyl ketone (molar ratio 1:1) at 50° C. (yield 71.5% of the theoretical).

EXAMPLE 11

68.0 g. (0.4 mol) of 5-chlorobenzofurazane-N-oxide are dissolved in 200 cc. of methanol and 100 cc. (excess) of diethylketone, and 29 g. (0.4 mol) of butylamine are added dropwise at 40 to 50° C. Crystals start to separate out after 15 minutes. The reaction mixture is then stirred for 2 hours at 50° C. filtered under suction and washed with methanol.

67 g. (=73% of the theoretical) of 2-methyl-3-ethyl-7-chloroquinoxaline-di-N-oxide are obtained as pale yellow crystals which melt at 142 to 144° C. after recrystallisation from ethanol.

*Analysis.*—$C_{11}H_{11}ClN_2O_2$ (mol. wt. 239). Calculated (percent): C, 55.40; H, 4.62; Cl, 14.88; N, 11.72; O, 13.40. Found (percent): C, 54.76; H, 4.94; Cl, 14.80; N, 11,71; O, 13.40.

EXAMPLE 12

(a) 17 g. (0.1 mol) 5 chlorobenzofurazane-N-oxide are melted together with 19.8 g. (0.1 mol) of methylundecylketone and 50 cc. of methanol, and 7.3 g. (0.1 mol) of butylamine are added dropwise at 50° C.

The reaction mixture is then stirred for 5 hours at 50° C. 2-methyl-3-decyl-7-chloroquinoxaline-di-N-oxide crystallises on cooling. Yield 25 g. (=71.5% of the theoretical) of pale yellow crystals which melt at 79 to 80° C. after recrystallisation from methanol.

*Analysis.*—$C_{19}H_{27}SlN_2O_2$ (mol. wt. 351). Calculated (percent): C, 65.20; H, 7.76; Cl, 10.10; N, 7.98; O, 9.14. Found (percent): C, 65.21; H, 7.58; Cl, 10.15; N, 7.74; O, 9.12.

(b) Ammonia is introduced for 4 hours at 50° C. into a solution of 41.3 g. (0.243 mol) of 5-chloro-benzofurazane and 48 g. (0.243 mol) of methylundecylketone in 300 cc. of methanol. A crystalline product separates while the reaction mixture is still warm. After filtration under suction, it is recrystallised from ethanol. The pale yellow crystals show no depressing of melting point over the compound prepared in (a). Yield 61 g. (=72% of the theoretical).

EXAMPLE 13

(a) 9.5 g. (0.13 mol) of butylamine are added dropwise at 50° C. to a solution of 17 g. (0.1 mol) of 5-chlorobenzofurazane-N-oxide and 28.2 g. (0.1 mol) of methylheptadecyl ketone. Deposition of crystals starts after 15 minutes. The reaction mixture is then stirred for 2 hours at 50° C. and filtered under suction; the 2-methyl-3-hexadecyl-7-chloro-quinoxaline-di-N-oxide obtained is recrystallised from ethanol. Yield: 30 g. (68% of the theoretical) of pale yellow crystals which melt at 92–93° C.

*Analysis.*—$C_{25}H_{29}ClN_2O_2$ (mol. wt. 435). Calculated (percent): C, 68.90; H, 9.04; Cl, 8.17; N, 6.44; O, 7.36. Found (percent): C, 68.57; H, 9.05; Cl, 8.15; N, 6.47; O, 7.40.

(b) Ammonia is introduced for 5 hours at 50° C. into a solution of 17 g. (0.1 mol) of 5-chlorobenzofurazane-N-oxide and 28.2 g. (0.1 mol) of methylheptadecyl ketone in 200 cc. of ethanol. The product is worked up as described under (a). Yield: 37 g. (=85% of the theoretical) of pale yellow crystals which show no lowering of melting point over the compound prepared in (a).

EXAMPLE 14

(a) 17 g. (0.1 mol) of 5-chlorobenzofurazane-N-oxide are dissolved in 50 cc. of methanol at 50° C. together with 18.2 g. (0.1 mol) of cyclododecanone. 8 g. (0.12 mol) of butylamine are added dropwise. The temperature rises to 53° C. as the butylamine is added. The reaction mixture is stirred for another hour at room temperature and the precipitated crystals are then separated by filtration under suction. 17 g. (=54% of the theoretical) of 2,3-cyclodecylene-7-chloro-quinoxaline-di-N-oxide of the following formula

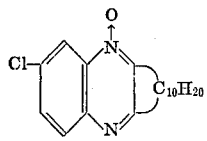

of melting point 122 to 124° C. are obtained.

*Analysis.*—$C_{18}H_{23}N_2O_2Cl$ (mol. wt. 334.5). Calculated (percent): C, 64.6; H 6.89; N, 8.13. Found (percent): C, 65.0; H, 7.1; N, 8.34.

(b) 34 g. (0.2 mol) of 5-chlorobenzofurazane-N-oxide are dissolved in 150 cc. of methanol together with 36.4 g. of cyclododecanone of 50° C. and this operation is followed by the introduction of ammonia for 4 hours at 40° C. The reaction mixture is left to stand overnight. The precipitated product is separated from solvent by filtration under suction. 52 g. (=77.5% of the theoretical) of pale yellow crystals of melting point 122 to 124° C. are obtained which show no lowering of melting point over the compound prepared in (a).

EXAMPLE 15

30.4 g. (0.2 mol) of 5-methyl-benzofurazane-N-oxide are dissolved in 100 cc. (excess) of acetone, and 18.2 g. (0.25 mol) of butylamine are added dropwise at 40 to 50° C. The reaction mixture is then stirred for two hours at 50° C. 18.5 g. (=49% of the theoretical) of 2,7-dimethyl-quinoxaline-di-N-oxide are obtained as pale yellow crystals which melt at 183 to 184° C. (with decomposition) after crystallisation from ethanol.

*Analysis.*—$C_{10}H_{10}N_2O_2$ (mol. wt. 190). Calculated (percent): C, 63.20; H, 5.26; N, 14.74. Found (percent): C, 62.7, H, 5.20; N, 14.50; (mol. wt. 192).

EXAMPLE 16

(a) 14.6 g. (0.2 mol) of butylamine are added dropwise at 40 to 50° C. to a solution of 30.4 g. (0.2 mol) of 5-methyl-benzofurazane-N-oxide in 100 cc. (excess) of methyl ethyl ketone. The crystalline product starts to separate after 15 minutes. The reaction mixture is then stirred for another hour at 50° C., cooled and filtered under suction, and the product is recrystallised from isopropanol. 35.5 g. (=77.5% of the theoretical) of 2,3,7-trimethyl-quinoxaline-di-N-oxide are obtained in the form of pale yellow crystals which melt at 155 to 176° C.

*Analysis.*—$C_{11}H_{12}N_2O_2$ (mol. wt. 204). Calculated (percent): C 64.70; H, 5.89; N, 13.72; O, 15.68. Found (percent): C, 64.75; H, 5.86; N, 13.74; O, 15.72.

(b) If ammonia, methylamine or propylamine is used in the appropriate quantity instead of butylamine, the same compound of melting point 155 to 156° C. is obtained in each case.

EXAMPLE 17

14.6 g. (0.2 mol) of butylamine are added dropwise at 40 to 50° C. to a solution of 30.4 g. (0.2 mol) of 5-methyl-benzofurazane-N-oxide in 100 cc. (excess) of diethylketone, and the solution is then stirred for 3 hours at 50° C. 24 g. (=55% of the theoretical) of 2,7-dimethyl-3-ethyl-quinoxaline-di-N-oxide separate out on cooling in the form of pale yellow crystals which melt at 150 to 152° C. after recrystallisation from isopropanol.

*Analysis.*—$C_{12}H_{14}N_2O_2$ (mol. wt. 218). Calculated (percent): C, 66.0; H, 6.46; N, 12.82; O, 14.65. Found (percent): C, 65.73; H, 6.49; N, 12.83; O, 14.74 (mol. wt. 210).

EXAMPLE 18

(a) 30 g. (0.20 mol) 5-methyl-benzofurazane-N-oxide are dissolved together with 36.4 g. (0.20 mol) cyclodecanone in 100 cc. methanol at 50° C. 20 g. cyclohexylamine are added dropwise to this solution and the reaction mixture is heated for 4 hours at 60° C. A crystalline paste forms which is separated by filtration under suction when it has cooled to 10° C. After washing with methanol 38 g. (=60.7% of the theoretical) of 2,3-cyclodecylene-7-methyl-quinoxaline-di-N-oxide are obtained in the form of pale yellow crystals which melt at 144 to 146° C. after they have been redissolved in toluene and left to crystallise.

*Analysis.*—$C_{19}H_{26}N_2O_2$ (mol. wt. 314). Calculated (percent): C, 69.4; H, 8.27; N, 8.92. Found (percent): C, 71.95; H, 8.14; N, 9.44.

(b) 30 g. (0.2 mol) of 5-methyl-benzofurazane-N-oxide are dissolved in 150 cc. of methanol at 50° C. together with 36.4 g. (0.2 mol) of cyclododecanone. Ammonia is then passed through the solution for 3 hours and the reaction mixture is then heated to boiling for 15 minutes. On working up after cooling, 36 g. (=58.8% of the theoretical) of crystals are obtained. They melt at 144 to 146° C. after they have been redissolved and crystallised from toluene, and they show no lowering of melting point over the compound prepared in (a).

EXAMPLE 19

15 g. (0.205 mol) of butylamine are added dropwise at 40 to 45° C. into a solution of 32.2 g. (0.2 mol) of 5-methoxy-benzofurazane-N-oxide in 100 cc. of acetone, and the solution is then stirred for 4 hours at 45° C. After cooling, the precipitated product is separated from the solvent by filtration under suction and recrystallised from dioxane. 7 g. (=18% of the theoretical) of 2-methyl-7-methoxy-quinoxaline-di-N-oxide are obtained as pale yellow crystals of melting point 208° C. (with decomposition).

EXAMPLE 20

33.2 g. (0.2 mole) of 5-methoxybenzofurazane-N-oxide are dissolved in 100 cc. methyl ethyl ketone (excess), and 15 g. (0.20 mol) of butylamine are added dropwise at 40 to 45° C. The reaction product starts to separate after 30 minutes. The reaction mixture is then stirred for another 2 hours at 40° C., is cooled and filtered under suction, and is recrystallised from ethanol. 39 g. (=88.5% of the theoretical) of 2,3-dimethyl-7-methoxy-quinoxaline-di-N-oxide are obtained in the form of pale yellow crystals of melting point 196 to 198° C.

*Analysis.*—$C_{11}H_{12}N_2O_3$ (mol. wt. 220). Calculated percent): C, 60.10; H, 5.45; N, 12.75. Found (percent): C, 60.05; H, 5.80; N, 12.49.

EXAMPLE 21

33.2 g. (0.2 mol) of 5-methoxybenzofurazane-N-oxide are melted together with 56.4 g. (0.2 mol) of methyl heptadecyl ketone in 250 cc. of ethanol, and ammonia is then passed through for 4 hours at 45 to 50° C. After cooling, the precipitated product is separated from solvent by filtration under suction and recrystallised from light petroleum ether. 70 g. (=81.5% of the theoretical) of 2-methyl - 3-hexadecyl-7-methoxy-quinoxaline-di-N-oxide are obtained as pale yellow crystals. M.P. 77 to 78° C.

Analysis.—$C_{26}H_{42}N_2O_3$ (mol. wt. 430). Calculated (percent): C, 72.60; H, 9.77; N, 6.52; O, 11.12. Found (percent): C, 73.18; H, 10.06; N, 6.45; O, 11.04.

EXAMPLE 22

15 g. (0.205 mol) of butylamine are added dropwise at 40 to 50° C. to a solution of 36 g. (0.2 mol) of 5-ethoxy-benzofurazane-N-oxide in 75 cc. (excess) acetone, and the solution is then stirred for 4 hours at 50° C. 10 g. (=24% of the theoretical) of 2-methyl-7-ethoxy-quinoxaline-di-N-oxide separate on cooling as pale yellow crystals which melt at 202° C. (decomposition) after recrystallisation from ethanol.

Analysis.—$C_{11}H_{12}N_2O_3$ (mol. wt. 220). Calculated (percent): C, 59.90; H, 5.45; N, 12.75. Found (percent): C, 59.42; H, 5.44; N, 12.62 (mol. wt. 214).

EXAMPLE 23

54 g. (0.30 mol) of 5-ethoxy-benzofurazane-N-oxide are dissolved in a mixture of 200 cc. of ethanol and 23.8 g. (0.33 mol) of methyl ethyl ketone, and ammonia is then passed through for 3 hours at 50° C. 2,3-dimethyl-7-ethoxy-quinoxaline-di-N-oxide separates as a crystalline precipitate. Yield: 59 g. (=84% of the theoretical) of pale yellow crystals which melt at 160 to 162° C. after recrystallisation from alcohol.

Analysis.—$C_{12}H_{14}N_2O_3$ (mol. wt. 234). Calculated (percent): C, 61.60; H, 6.02; N, 11.96; O, 20.52. Found (percent): C, 61.60; H, 6.18; N, 12.19; O, 20.84.

EXAMPLE 24

15 g. (0.205 mol) of butylamine are added dropwise at 40 to 50° C. to a solution of 36 g. (0.20 mol) of 5-ethoxy-benzofurazane-N-oxide and 19 g. (0.22 mol) of diethylketone in 100 cc. of ethanol, and the solution is then stirred for another 4 hours at 40 to 50° C. After cooling, filtration under suction and washing with ethanol, 28 g. (=56.5% of the theoretical) of 2-methyl-3-ethyl-7-ethoxy-quinoxaline-di-N-oxide are obtained in the form of pale yellow crystals which melt at 167 to 168° C. after recrystallisation from methanol.

Analysis.—$C_{13}H_{16}N_2O_3$ (mol. wt. 248). Calculated (percent): C, 62.85; H, 6.45; N, 11.28; O, 19.36. Found (percent): C, 62.43; H, 6.37; N, 11.58; O, 19.90 (mol. wt. 235).

EXAMPLE 25

15 g. (0.205 mol) of butylamine-N-oxide are added dropwise at 40 to 50° C. to a solution of 36 g. (0.20 mol) of 5-ethoxy-benzofuroxane and 17.3 g. (0.20 mol) of methylpropylketone, and the solution is stirred for 4 hours at 40 to 50° C. 25 g. (=50.5% of the theoretical) of 2-ethyl - 3 - methyl - 7 - ethoxy-quinoxaline-di-N-oxide separate on cooling as pale yellow crystals which melt at 174 to 175° C. after recrystallisation from ethanol. The compound has the same melting point as the isomeric 2 - methyl - 3 - ethyl-7-ethoxy-quinoxaline-di-N-oxide but undergoes a strong depression of the melting point (mixed melting point: 145 to 147° C.).

EXAMPLE 26

36 g. (0.2 mol) of 5-ethoxy-benzofurazane-N-oxide are dissolved in 250 cc. of ethanol together with 56.4 g. of methylheptadecylketone (0.2 mol) and ammonia is passed through for 4 hours at 50° C. 75 g. (=84.5% of the theoretical) of 2-methyl-3-hexadecyl-7-ethoxy-quinoxaline-di-N-oxide separate as pale yellow crystals which melt at 97 to 98° C. after they have been redissolved in ethanol and crystallised out therefrom.

Analysis.—$C_{27}H_{44}N_2O_3$ (mol. wt. 444). Calculated (percent): C, 72.80; H, 9.92; N, 6.32; O, 11.82. Found (percent): C, 72.82; H, 10.28; N, 6.30; O, 11.36.

EXAMPLE 27

(a) 36 g. (0.20 mol) of 5-ethoxy-benzofurazane-N-oxide are dissolved in 100 cc. of ethanol at 50° C. together with 36.4 g. (0.20 mol) of cyclododecanone. 15 g. butylamine are added and the reaction mixture is heated for one hour at 50° C. during which a thick crystalline paste separates out. The reaction mixture is then heated to boiling for 15 minutes. After cooling, the product is filtered under suction and washed with methanol. 30 g. (=43.6% of the theoretical) of 2,3-cyclodecylene-7-ethoxy-quinoxaline-di-N-oxide are obtained in the form of pale yellow crystals which melt at 202 to 204° C. after they have been redissolved in toluene and crystallised out therefrom.

Analysis.—$C_{20}H_{28}N_2O_3$ (mol. wt. 328). Calculated (percent): C, 69.7; H, 8.14; N, 8.14. Found (percent): C, 70.17; H, 8.17; N, 8.77.

(b) 36 g. (0.20 mol) of 5-ethoxy-benzofurazane-N-oxide are dissolved in 150 cc. of methanol at 50° C. together with 36.4 g. (0.20 mol) of cyclododecanone. Ammonia is then introduced for 3 hours without external heat supply. During this time, the temperature remains between 40 and 45° C. The reaction mixture is then heated to boiling for 15 minutes. After cooling, the crystalline paste formed is separated from solvent by filtration under suction and washed with methanol. 42 g. (=61% of the theoretical) of 2,3-cyclodecylene-7-ethoxy-quinoxaline-di-N-oxide are obtained as pale yellow crystals which melt at 202 to 204° C. and show no lowering of melting point over the compound prepared in (a).

EXAMPLE 28

13.6 g. (0.20 mol) of benzofurazane-N-oxide are dissolved in 50 cc. of methanol at 40° C. together with 13.0 g. (0.10 mol) of ethyl acetoacetate. 8 g. (0.11 mol) of butylamine are added dropwise and the solution is heated for 4 hours at 50° C. When the reaction mixture is left to stand for 24 hours at room temperature, 10 g. (=40.3% of the theoretical) of 2-methyl-3-ethoxycarbonylquinoxaline-di-N-oxide separate out as crystals which melt at 134 to 136° C. after recrystallisation from ethanol.

Analysis.—$C_{12}H_{12}N_2O_2$ (mol. wt. 248). Calculated (percent): C, 58.1; H, 4.85; N, 11.25. Found (percent): C, 58.1; H, 4.93; N, 11.35.

EXAMPLE 29

19.4 g. (0.1 mol) of 5-carbomethoxy-benzofurazane-N-oxide are dissolved in 150 cc. of ethanol together with 28.2 g. (0.1 mol) of methylheptadecylketone. Ammonia is then passed through for 6 hours at 50 to 55° C. After cooling, the precipitate is filtered off under suction and redissolved in ethanol and crystallised out therefrom. 28 g. (=61.5% of the theoretical) of 2-hexadecyl-3-methyl-7-carbomethoxy quinoxaline-di-N-oxide are obtained in the form of yellow crystals which melt at 90 to 91° C.

Analysis.—$C_{27}H_{42}N_2O_4$ (mol. wt. 459). Calculated (percent): C, 70.70; H, 9.22; N, 6.12; O, 13.93. Found (percent): C, 70.59; H, 9.16; N, 6.00; O, 13.70.

EXAMPLE 30

13 g. (0.045 mol) of 5-carboxy-(4-chloroanilide)-benzofurazane-N-oxide are suspended in 50 cc. of methyl ethyl ketone at 40° C., and 7.3 g. (0.1 mol) of butylamine are added dropwise with stirring. The temperature rises to 55° C., and the starting material gradually dissolves to provide a red solution. After a few minutes the reaction product is formed as a beige coloured precipitate. The reaction mixture is diluted with 50 cc. of ethanol and stirred for 2 hours at 50° C., filtered under suction and is recrystallised from dimethylformamide. 11.5 g. (=74.5% of the theoretical) of 2,3-dimethyl-quinoxaline-di-N-oxide-7-carboxylic acid-(4-chloroanilide) are obtained as yellow crystals which melt at 248° C.

Analysis.—$C_{17}H_{14}ClN_3O_3$ (mol. wt. 343.5). Calculated (percent): C, 59.5; H, 4.08; Cl, 10.34; N, 12.20; O, 14.02. Found (percent): C, 58.83; H, 4.67; Cl, 10.25; N, 12.14; O, 14.16.

EXAMPLE 31

15 g. (0.26 mol) of butylamine are added to a solution of 16.3 g. (0.1 mol) of 4,6-dimethyl-benzofurazane-N-oxide in 100 cc. of methyl ethyl ketone and the reaction mixture is boiled for 12 hours. It is then left to stand overnight and the precipitated compound is then filtered off under suction. 10 g. (=41% of the theoretical) of 2,3,5,7-tetramethyl-quinoxaline-di-N-oxide are obtained in the form of pale yellow crystals which melt at 164 to 166° C. after redissolving from ethanol and crystallising out therefrom.

Analysis.—$C_{12}H_{14}N_2O_2$ (mol. wt. 218). Calculated (percent): C, 66.10; H, 6.46; N, 12.86; O, 14.65. Found (percent): C, 65.85; H, 6.32; N, 12.74; O, 14.55.

EXAMPLE 32

14.6 g. (0.05 mol) of benzofurazane-N-oxide-5-[N-(2-pyridino)-sulphonamide] are suspended in 50 cc. of methyl ethyl ketone, and 7.3 g. (0.1 mol) of butylamine are added at 50° C. with stirring. A red solution is obtained. After about 30 minutes, the reaction product separates out. The reaction mixture is then stirred for another 4 hours at 45 to 50° C. during which the red colour disappears. After cooling, filtration under suction and washing with methanol and redissolving in dimethyl formamide and crystallising out therefrom 11 g. (=62.6% of the theoretical) of 2,3-dimethyl-quinoxaline-di-N-oxide-6-[N-(2-pyridino)-sulphonamide] are obtained in the form of yellow crystals which melt at 234° C. (decomposition).

Analysis.—$C_{15}H_{14}N_4SO_4$ (mol. wt. 346). Calculated (percent): C, 52.10; H, 4.04; N, 16.18; SO, 9.25, 18.50. Found (percent): C, 51.95; H, 4.11; N, 16.02; SO, 8.90, 18.25.

EXAMPLE 33

34 g. (0.2 mol) of 5-chloro-benzofurazane-N-oxide are dissolved in 200 cc. of methanol, 26 g. (0.2 mol) of ethyl acetoacetate are added and ammonia is passed through for 3 hours at 40 to 50° C. 21 g. (=37.5% of the theoretical) of 3-methyl-7-chloro-quinoxaline-1,4-di-N-oxide-2-carboxylic acid ethyl ester separate out in the form of yellow crystals which melt at 178 to 179° C. after redissolving in dimethylformamide/ethanol.

Analysis.—$C_{12}H_{11}ClN_2O_4$ (282.5). Calculated (percent): C, 50.99; H, 3.90; Cl, 12.55. Found (percent): C, 50.49; H, 4.31; Cl, 12.55.

EXAMPLE 34

5 g. (0.068 mol) of butylamine are added dropwise at 40 to 45° C. to a solution of 5.0 (0.023 mol) of 5-bromo-benzofurazane-N-oxide in 25 cc. of methyl ethyl ketone and 30 cc. of ethanol. The reaction mixture is then stirred for another 6 hours at this temperature. After cooling and filtration under suction, 5.75 g. (=62.5% of the theoretical) of 2,3-dimethyl-6-bromo-quinoxaline-di-N-oxide are obtained as pale yellow crystals which melt at 189 to 190° C. after redissolving in ethanol.

Analysis.—$C_{10}H_9BrN_2O_2$ (269). Calculated (percent): C, 44.60; H, 3.35; Br, 29.70; N, 10.41; O, 11.90. Found (percent): C, 43.69; H, 3.48; Br, 29.60; N, 10.34; O, 11.93.

EXAMPLE 35

10 g. (0.13 mol) of butylamine are added dropwise at 30 to 40° C. to a solution of 19.4 g. (0.1 mol) of benzofurazane-N-oxide 5-carboxylic acid methyl ester in 50 cc. of methyl ethyl ketone and 50 cc. of ethanol, and the reaction mixture is then stirred for another 3 hours at 45° C. After cooling, the crystalline paste formed is filtered under suction. 17 g. (=68.6%, 2,3-dimethyl-7-carbomethoxy-quinoxaline-di-N-oxide are obtained as pale yellow crystals melting at 185 to 186° C. by redissolving in ethanol/dioxane (10:1) and crystallising out therefrom.

Analysis.—$C_{12}H_{12}N_2O_4$ (248). Calcd. (percent): C, 58.20; H, 4.84; N, 11.29; O, 25.83. Found (percent): C, 58.23; H, 5.06; N, 11.28; O, 25.83.

EXAMPLE 36

83 g. (0.5 mol) of 5-methoxy-benzofurazane-N-oxide are dissolved in 750 cc. of methanol at 40° C. together with 99 g. (0.5 mol) of methyl-undecyl ketone, and ammonia is passed through for 8 hours at 40 to 45° C. The crystalline paste formed is filtered off under suction and washed with methanol. 155 g. (=89% of the theoretical) of 2-methyl-3-decyl-7-methoxy-quinoxaline-di-N-oxide are obtained as pale yellow crystals melting at 97 to 99° C. after recrystallisation from ethanol.

Analysis.—$C_{20}H_{30}N_2O_3$ (346). Calcd. (percent): C, 69.40; H, 8.68; N, 8.34; O, 13.88. Found (percent): C, 68.97; H, 8.91; N, 8.42; O, 14.06.

EXAMPLE 37

90 g. (0.5 mol) of 5-ethoxy-benzofurazane-N-oxide are dissolved in 750 cc. of methanol together with 99 g. (0.5 mol) of methylundecyl ketone, and ammonia is passed through for 8 hours at 40 to 45° C. The crystalline paste formed is filtered under suction and washed with methanol. 77 g.=39% of the theoretical of 2-methyl-3-decyl-7-ethoxy-quinoxaline-di-N-oxide are obtained as pale yellow crystals melting at 84 to 86° C., after recrystallising from ethanol.

Analysis.—$C_{21}H_{32}N_2O_3$ (360). Calcd. (percent): C, 70.10; H, 8.89; N, 7.89; O, 13.32. Found (percent): C, 70.30; H, 8.88; N, 7.96; O, 13.41.

EXAMPLE 38

32.6 g. (0.2 mol) of 4,6-dimethyl-benzofurazane-N-oxide are dissolved in 100 cc. of ethanol together with 56.4 g. (0.2 mol) of methyl-heptadecylketone. 25 cc. (0.24 mol) of butylamine are added and the reaction mixture is boiled for 18 hours. 23 g. (=27% of the theoretical) of 2,5,7-trimethyl-3-hexadecyl-quinoxaline-di-N-oxide separate out on cooling as pale yellow crystals which melt at 75 to 76° C. after they have been crystallised from ethanol.

Analysis.—$C_{27}H_{44}N_2O_2$ (428). Calcd. (percent): C, 75.8; H, 10.25; N, 6.53. Found (percent): C, 77.0; H, 10.61; N, 6.2.

EXAMPLE 39

152 g. (1 mol) of 5-methyl-benzofurazane-N-oxide are dissolved in 1 litre of methanol at 50° C. together with 282 g. (1 mol) of methyl heptadecyl ketone. When ammonia is passed through the reaction mixture, the temperature remains at 50 to 55° C. for about one hour. Thereafter, the reaction mixture is heated to keep it at the same temperature for another 5 hours while continuously passing through ammonia. When the crystalline paste is formed, 200 cc. of methanol are added to dilute the reaction mixture. After separation of solvent by filtration under suction and recrystallising from ethanol, 249 g. (=60% of the theoretical) of 2,7-dimethyl-3-hexadecyl-quinoxaline-di-N-oxide are obtained as pale yellow crystals which melt at 91 to 93° C.

Analysis.—$C_2 H_{42}N_2O_2$ (414). Calcd. (percent): C, 77.50; H, 10.23; N, 6.78; O, 7.33. Found (percent): C, 75.05; H, 10.25; N, 6.96; O, 7.97.

EXAMPLE 40

55 g. (0.475 mol) laevulinic acid amide are suspended in 250 cc. of methanol at 60° C. together with 79.5 g. (0.475 mol) of 5-methoxy-benzofurazane-N-oxide. When 35 g. (0.475 mol) of butylamine is added dropwise, both the amide and the benzofuroxane compound dissolve. This solution is boiled for one hour, cooled and filtered under suction. On recrystallising out from water, 64 g. (=51% of the theoretical) of 2-methyl-7-methoxy-quinoxaline-1,4-di-N-oxide-3-acetic acid amide are obtained as very pale yellow crystals which melt at 238° C.

Analysis.—$C_{12}H_{13}N_3O_4$ (263). Calcd. (percent): C, 55.7; H, 4.94; N, 15.98; O, 24.30. Found (percent): C, 54.86; H, 4.99; N, 15.89; O, 24.16.

EXAMPLE 41

35 g. of laevulinic acid anilide (0.2 mol) are dissolved in 100 cc. of methanol at 30° C. together with 27.2 g. (0.2 mol) of benzofurazane-N-oxide. 15 g. (0.2 mol) of butylamine are added dropwise, and the temperature rises to 40° C. The reaction mixture is then stirred for another 40 hours at 40° C., after which it is cooled and the crystalline paste obtained is filtered under suction. After boiling with ethanol, cooling and filtering under suction, 48.5 g. (82.5% of the theoretical) of colourless 2-methyl-quinoxaline-1,4 - di-N-oxide-3-acetanilide which melts at 220 to 221° C. (decomposition) after crystallisation from ethanol/dimethylformamide are obtained.

Analysis.—$C_{17}H_{15}N_3O_3$ (309). Calculated (percent): C, 65.61; H, 4.86; N, 13.60; O, 15.52. Found (percent): C, 65.76; H, 4.90; N, 13.96; O, 15.62.

EXAMPLE 42

123 g. (0.9 mol) of benzofurazane-N-oxide are dissolved in 500 cc. of methanol together with 235 g. (0.9 mol) of laevulinic acid-3,4-dichloroanilide, and 72.5 g. (0.99 mol) of butylamine are added dropwise without cooling. As the butylamine is added, the temperature of the solution rises to 55° C. Crystals start to separate out after 15 minutes. The reaction mixture is then stirred for another 5 hours at 50 to 55° C., filtered under suction and washed with methanol. 287 g. (=84% of the theoretical) of 2-methylquinoxaline - 1,4-di-N-oxide-3-acetic acid-(3',4'-di-chloro)-anilide are obtained as colourless crystals which melt at 220° C. after recrystallisation from dimethylformamide.

Analysis.—$C_{17}H_{13}Cl_2N_3O_3$ (378). Cal. (percent): C, 53.99; H, 3.44; Cl, 18.78. Found (percent): C, 53.60; H, 3.66; Cl, 18.45.

EXAMPLE 43

30 g. of 5-chloro-benzofurazane-N-oxide (0.173 mol) are dissolved in 100 cc. of methanol together with 45 g. of acetoacetic acid 3,4-dichloroanilide (0.173 mol). 14 g. (0.19 mol) of butylamine are added dropwise without cooling, the temperature rising to 50° C. during this addition. The reaction mixture is then stirred for another 4 hours at 50° C. and cooled. 56 g. (=77.5% of the theoretical) of 2-methyl-7-chloro-quinoxaline-1,4-di-N-oxide-3-carboxylic acid-(3',4'-dichloro)-anilide separate out as pale yellow crystals which melt at 183 to 184° C. after recrystallsation from dimethylformamide.

Analysis.—$C_{17}H_{12}Cl_3N_3O_3$ (412). Cal. (percent): C, 49.60; H, 2.91; Cl, 25.76; N, 10.19. Found (percent): C, 49.95; H, 2.98; Cl, 25.60; N, 10.15.

EXAMPLE 44

27.2 g. (0.2 mol) of benzofurazane-N-oxide are dissolved in 150 cc. of methanol together with 54.2 g. of acetoacet-4-chloro-2,5-dimethoxy-anilide (0.2 mol) and 20 g. (0.27 mol) of butylamine are added dropwise without cooling. On addition of butylamine, the temperature of the solution rises to boiling. The solution is boiled for a further 30 minutes and after cooling, 2-methylquinoxaline-1,4-di-N-oxide-3-carboxylic acid-(4'-chloro-2',5' - dimethoxy)-anilide are filtered off under suction. 39 g. (=50% of the theoretical) of yellow crystals which melt at 227 to 228° C. (decomposition) after crystallisation from dimethylformamide are obtained.

Analysis.—$C_{18}H_{16}ClN_3O_5$ (389.5). Cal. (percent): C, 55.60; H, 4.12; Cl, 9.12; N, 10.80; O, 20.60. Found (percent): C, 55.25; H, 4.30; Cl, 9.00; N, 11.13; O, 20.42.

EXAMPLE 45

68 g. (0.5 mol) of benzofurazane-N-oxide are dissolved in 500 cc. of methanol together with 96 g. (0.5 mol) of acetoacet-2-methoxy-anilide, and 50 g. (0.68 mol) of butylamine are added dropwise without cooling, the temperature rising to 60° C. in this operation. The reaction mixture is then boiled for 30 minutes, and the precipitated 2-methyl-quinoxaline-1,4-di-N-oxide - 3 - carboxylic acid-(2'-methoxy)-anilide crystals are separated off by filtration under suction after cooling.

87 g. (=53% of the theoretical) of yellow crystals which melt at 190 to 191° C. after recrystallisation from toluene are obtained.

Analysis.—$C_{17}H_{15}N_3O_4$ (325). Cal. (percent): C, 62.80; H, 4.62; N, 12.92; O, 19.68. Found (percent): C, 63.07; H, 4.71; N, 12.98; Cl, 19.36.

EXAMPLE 46

68 g. (0.5 mol) of benzofurazane-N-oxide are dissolved in 500 cc. of methanol together with 115 g. (0.5 mol) of acetoacet-2-methyl-4-chloroanilide. 50 g. (0.68 mol) of butylamine are added dropwise without cooling and the temperature of the solution rises to about 60° C. The reaction mixture is then boiled for 30 minutes and the crystalline paste which is formed is filtered under suction, after cooling. 79 g. (=46% of the theoretical) of 2-methyl-quinoxaline - 1,4 - di - N - oxide - 3 - carboxylic acid-(2'-methyl-4'-chloro)-anilide are obtained as yellow crystals melting at 207° C. after recrystallisation from toluene/dimethylformamide.

Analysis.—$C_{17}H_{14}ClN_3O_3$ (343.5). Cal. (percent): C, 59.75; H, 4.08; Cl, 10.35; N, 12.25; O, 13.99. Found (percent): C, 59.29; H, 4.47; Cl, 12.25; N, 12.14; O, 13.70.

EXAMPLE 47

106 g. (0.5 mol) of acetoacet-2-chloroanilide are dissolved in 500 cc. of methanol together with 68 g. (0.5 mol) of benzofurazane-N-oxide and 50 g. of cyclohexylamine (0.5 mol) are added dropwise without cooling, the solution heating up to 50° C. The reaction mixture is then boiled for one hour, and the 2-methyl-quinoxaline-1,4-di-N-oxide-3-carboxylic acid-(2'-chloro)-anilide which is precipitated, is filtered off under suction after cooling. 50 g.=30% of yellow crystals which melt at 208 to 209° C. after they have been recrystallised from dimethylformamide are obtained.

Analysis.—$C_{16}H_{12}ClN_3O_3$ (329.5). Cal. (percent): C, 58.35; H, 3.67; Cl, 10.77; N, 12.75; O, 14.56. Found (percent): C, 58.28; H, 3.77; Cl, 9.90; N, 12.58; O, 14.44.

EXAMPLE 48

85 g. (0.5 mol) of 5-chloro-benzofurazane-N-oxide are dissolved in 100 cc. of ethanol together with 88.5 (0.5 mol) of acetoacetanilide, and ammonia is passed through the solution, the temperature of which rises to 50° C. The solution is then stirred for 4 hours at 45 to 50° C., and 90 g. (=55% of the theoretical) of 2-methyl-7-chloro-quinoxaline-1,4-di-N-oxide-3-carboxylic acid anilide are obtained in the form of pale yellow crystals by cooling and filtration under suction. After they have been recrystallised from dimethylformamide, these crystals melt at 206 to 207° C.

Analysis.—$C_{16}H_{12}ClN_3O_3$ (329.6). Cal. (percent): C, 58.20; H, 3.65; Cl, 10.75; N, 12.75; O, 14.58. Found (percent): C, 57.93; H, 3.85; Cl, 10.60; N, 12.77; O, 14.69.

EXAMPLE 49

85 g. (0.5 mol) of 5-chloro-benzofurazane-N-oxide are dissolved in 500 cc. of methanol together with 106 g. (0.5 mol) of acetoacet-2-chloroanilide, and 50 g. (0.6 mol) of butylamine are added dropwise without cooling, the temperature of the solution consequently rising to 60° C. The solution is then stirred for 2 hours without heating, and the crystalline paste formed is filtered under suction. 84 g. (=46% of the theoretical) of 2-methyl-7-chloro-quinoxaline-1,4-di-N-oxide-3-carboxylic acid - (2' - chloro)-anilide are obtained as yellow crystals after recrystallisation from dimethylformamide. The crystals melt at 185 to 186° C.

Analysis.—Cal. (percent): C, 52.70; H, 3.02; Cl, 19.51; N, 11.52; O, 13.19. Found (percent): C, 52.44; H, 3.39; Cl, 19.40; N, 11.49; O, 13.42.

EXAMPLE 50

17 g. (0.1 mol) of 5-chloro-benzofurazane-N-oxide are dissolved in 100 cc. of methanol together with 37.1 g. (0.1 mol) of acetoacet - 4-chloro-2,5-dimethoxy-anilide, and 8 g. (0.11 mol) of butylamine are added dropwise without cooling, the temperature of the solution thereby rising to 50 to 60° C. Stirring is continued for 3 hours without heating. 20 g. (=44% of the theoretical) of 2-methyl - 7-chloro-quinoxaline-1,4-di-N-oxide-3-carboxylic acid (4'-chloro-2',5'-dimethoxy)-anilide are obtained as yellow crystals, which after recrystallisation from dimethylformamide, melt at 224 to 225° C. (with decomposition).

Analysis.—$C_{18}H_{15}Cl_2N_3O_5$ (424). Cal. (percent): C, 50.90; H, 3.57; Cl, 16.72; N, 9.92. Found (percent): C, 51.42; H, 3.44; Cl, 16.85; N, 10.42.

EXAMPLE 51

17 g. (0.1 mol) of 5-chlorobenzofurazane-N-oxide are dissolved in 100 cc. of methanol together with 19.1 g. (0.1 mol) of acetoacet-2-methylanilide, and 8 g. (0.11 mol) of butylamine are added dropwise without cooling, the solution temperature thereby rising to 50 to 60° C. Stirring is continued for 3 hours at 45 to 50° C. and after cooling and filtration under suction 11 g. (=32% of the theoretical) of 2 - methyl-7-chloro-quinoxaline-1,4,-di-N-oxide-3-carboxylic acid-(2'-methyl)-anilide are obtained in the form of yellow crystals which, after recrystallisation from dimethylformamide, melt at 197 to 198° C.

Analysis.—$C_{17}H_{14}ClN_3O_3$ (343.5). Cal. (percent): C, 59.40; H, 4.08; Cl, 10.33; N, 12.22. Found (percent): C, 59.14; H, 4.23; Cl, 10.75; N, 12.34.

EXAMPLE 52

17 g. (0.1 mol) of 5-chloro-benzofurazane-N-oxide are dissolved in 100 cc. of methanol together with 20.5 g. (0.1 mol) of acetoacet-2,4-dimethylanilide, and 8 g. (0.11 mol) of butylamine are added dropwise without cooling, the solution temperature thereby rising to 50 to 60° C. The solution is stirred for another 3 hours at this temperature, and after cooling and filtration under suction 16 g. (=45% of the theoretical) of 2-methyl-7-chloro-quinoxaline-1,4-di-N-oxide-3-carboxylic acid-(2',4'-dimethyl)-anilide are obtained as yellow crystals which, after recrystallisation from dimethylformamide, melt at 180 to 181° C.

Analysis.—$C_{18}H_{16}ClN_3O_3$ (358). Cal. (percent): C, 60.40; H, 4.47; N, 11.73. Found (percent): C, 59.86; H, 4.41; N, 11.52.

EXAMPLE 53

17 g. (0.1 mol) of 5-chloro-benzofurazane-N-oxide are dissolved in 100 cc. of methanol together with 20.5 g. (0.1 mol) of acetoacet-2-methoxy-anilide, and 8 g. (0.11 mol) of butylamine are added dropwise without cooling, the solution temperature thereby increasing to 50 to 60° C. The solution is then stirred for 3 hours at this temperature, and, after cooling and filtration under suction 11 g. (=30.5% of the theoretical) of 2-methyl-7-chloro-quinoxaline - 1,4 - di-N-oxide-3-carboxylic acid-(2'-methoxy)-anilide are obtained as yellow crystals which melt at 150 to 152° C. after recrystallisation from dimethylformamide.

Analysis.—$C_{17}H_{14}ClN_3O_4$ (360). Cal. (percent): C, 56.80; H, 3.89; Cl, 9.89. Found (percent): C, 56.15; H, 3.98; Cl, 9.70.

EXAMPLE 54

17 g. (0.1 mol) of 5-chloro-benzofurazane-N-oxide are dissolved in 150 cc. of methanol together with 22.5 g. (0.1 mol) of acetoacet-2-methyl-4-chloroanilide, and 8 g. (0.11 mol) of butylamine are added dropwise without cooling, the solution temperature thereby increasing to boiling. The solution is then stirred for 30 minutes at its boiling point and is then cooled. 12 g. (=32% of the theoretical) of 2-methyl - 7-chloro-quinoxaline-1,4-di-N-oxide-3-carboxylic acid-(2'-methyl-4'-chloro)anilide separate out in the form of yellow crystals which, after recrystallisation from dimethylformamide, melt at 209° C.

Analysis.—$C_{17}H_{13}Cl_2N_3O_3$ (378). Cal. (percent): C, 54.0; H, 3.44; Cl, 18.75; N, 11.22. Found (percent): C, 54.3; H, 3.35; Cl, 18.80; N, 11.37.

EXAMPLE 55

13.6 g. (0.1 mol) of benzofurazane-N-oxide are dissolved in 100 cc. of methanol together with 25.6 g. (0.1 mol) of acetoacet-4-sulphoamido-anilide, and 8 g. (0.11 mol) of butylamine are added dropwise without cooling, the solution temperature thereby increasing to about 60° C. 23 g. (=62% of the theoretical) of 2-methyl-quinoxaline - 1,4 - di - N-oxide-3-carboxylic acid (4'-sulphonamido)-anilide separate out as colourless crystals which, after recrystallisation from dimethyl formamide, melt at 154° C. with decomposition.

Analysis.—$C_{16}H_{14}N_3SO_5$ (374). Cal. (percent): C, 51.49; H, 3.75; N, 14.93; S. 8.56; O. 21.40. Found (percent): C, 51.40; H, 3.95; N, 14.91; S, 7.95; O, 21.13.

EXAMPLE 56

16.6 g. (0.1 mol) of 5-methoxy-benzofurazane-N-oxide are dissolved in 200 cc. of methanol at 40° C. together with 28.1 g. (0.1 mol) of the N-azobenzene-amide of acetoacetic acid, and 8 g. (0.11 mol) of butylamine are added dropwise. After 4 hours' stirring at 40° C. the reaction mixture is cooled. 28 g. (=65% of the theoretical) of 2-methyl-7-methoxy-quinoxaline-1,4-di-N-oxide-3-carboxylic acid N-azobenzene-amide separate out in the form of orange red crystals which, after recrystallisation from dimethylformamide and ethanol melt at 231–232° C. with decomposition.

Analysis.—$C_{23}H_{19}N_5O_4$ (429). Cal. (percent): C, 64.30; H, 4.57; N, 16.09; O, 14.91. Found (percent): C, 64.62; H, 4.62; N, 16.79; O, 14.73.

EXAMPLE 57

110 g. (0.65 mol) of 5-ethoxy-benzofurazane-N-oxide are dissolved in 250 c. of methanol together with 95 g. (0.65 mol) of the N-pyrrolidide of acetoacetic acid. The temperature is maintained at 45–50° C. during this operation by occasional cooling, and the reaction mixture is then stirred for another 4 hours at this temperature. 131 g. (=67.5% of the theoretical) of 2-methyl-7-ethoxy-quinoxaline-1,4-di-N-oxide-3-carboxylic acid pyrrolidide separate out on cooling as yellow crystals which melt at 132 to 133° C. after recrystallisation from methanol.

Analysis.—$C_{16}H_{19}N_3O_4$ (317) Cal. (percent): C, 60.6; H, 6.00; N, 13.29; O, 20.2. Found (percent): C, 59.3; H, 6.06; N; 13.38; O, 20.9.

EXAMPLE 58

83 g. (0.55 mol) of 5-methyl-benzofurazane-N-oxide are dissolved in 200 cc. of methanol together with 93 g. (0.55 mol) of the piperidide of acetoacetic acid, and 45 g. (0.6 mol) of butylamine are added dropwise, the temperature of the solution thereby rising to 50° C. The solution is then stirred for 3 hours at this temperature, and 115 g.=69% of the theoretical of 2,7-dimethyl-quinoxaline-1,4-di-N-oxide-3-carboxylic acid N-piperidide precipitate on cooling as yellow crystals which after recrystallisation from dimethylformamide, melt at 135° C. with decomposition.

Analysis.—$C_{16}H_{19}N_3O_3$ (301). Cal. (percent): C, 63.80; H, 6.32; N, 13.97. Found (percent): C, 62.71; H, 6.34; N, 13.90.

EXAMPLE 59

68 g. (0.5 mol) of benzofurazane-N-oxide are dissolved in 400 cc. of methanol at 40° C. together with 134.5 g. (0.5 mol) of acetoacetic acid-n-dodecylamide, and ammonia is passed therethrough. The temperature rises to 50 to 55° C. More ammonia is passed through for another 3 hours, and after the heat of reaction has died down, the reaction mixture is heated on a heating bath to 50 to 55° C. A thick crystalline paste is formed and it is filtered under suction after cooling and is then washed with methanol. After redissolving this precipitate in a large quantity of ethanol and leaving to crystallise, 137 g. (=71% of the theoretical) of 2-methylquinoxaline-1,4-di-N-oxide-3-carboxylic acid-n-dodecylamide are obtained as pale yellow crystals of M.P. 151 to 152°.

Analysis.—$C_{23}H_{33}N_3O_3$ (387). Cal. (percent): C, 68.25; H, 8.52; N, 10.85; O, 12.40. Found (percent): C, 67.61; H, 8.62; N, 10.69; O, 12.59.

EXAMPLE 60

75 g. (0.5 mol) of 5-methyl-benzofurazane-N-oxide are dissolved in 1 litre of methanol at 40° C. together with 134.5 g. (0.5 mol) of aceto-acetic acid-n-dodecylamide, and ammonia is passed therethrough while the solution is stirred, the temperature of the solution rising to 50° C. during this operation. When the heat of reaction has died down, the solution is heated to 50 to 55° C. and more ammonia is passed through for another 3 hours. 2,7 - dimethyl - quinoxaline - 1,4 - di - N - oxide - 3-carboxylic acid-n-dodecylamide separates out while the reaction mixture is still warm. The reaction mixture is cooled and filtered under suction, and the product is recrystallised from a mixture of ethanol and dimethylformamide (3:1). 107 g. (=52% of the theoretical) of pale yellow crystals of M.P. 150–151° C. are obtained.

Analysis.—$C_{23}H_{35}N_3O_3$ (401). Cal. (percent): C, 68.80; H, 8.74; N, 10.47; O, 11.95. Found (percent): C, 68.71; H, 8.73; N, 10.42; O, 12.22.

EXAMPLE 61

90 g. (0.5 mol) of 5-ethoxybenzofurazane-N-oxide are dissolved in 1 litre of methanol at 40° C. together with 134.5 g. (0.5 mol) of aceto-acetic acid-n-dodecylamide, and ammonia is passed therethrough while the solution is stirred, the temperature of the solution rising to 55° C. When the heat of reaction has been dissipated, the solution is heated to boiling for 20 minutes while more ammonia is passed through. 124 g. (=58% of the theoretical) of 2 - methyl - 7 - ethoxy - quinoxaline - 1,4 - di - N-oxide-3-carboxylic acid-n-dodecylamide separate out on cooling in the form of pale yellow crystals which, after recrystallisation from isopropanol melt at 152 to 154° C.

EXAMPLE 62

85 g. (0.5 mol) of 5-chloro-benzofurazane-N-oxide are dissolved in 1 litre of methanol at 40° C. together with 134.5 g. (0.5 mol) of aceto-acetic acid-n-dodecylamide, and 100 g. (1 mol) of cyclohexylamine are added dropwise. The temperature rises to 55° C. Stirring is continued for 5 hours at this temperature and the reaction mixture is then cooled. 72 g.=34% of the theoretical of 2-methyl-7-chloro - quinoxaline - 1,4 - di - N - oxide - 3 - carboxylic acid-n-dodecylamide separate out as pale yellow crystals which melt at 155 to 156° C. after recrystallisation from a mixture of ethanol and dimethylformamide (3:1).

Analysis.—$C_{22}H_{32}ClN_3O_3$ (421.5). Cal. (percent): C, 62.70; H, 7.60; Cl, 8.42; N, 9.99; O, 11.38. Found (percent): C, 63.00; H, 7.86; Cl, 8.20; N, 10.18; O, 10.86.

EXAMPLE 63

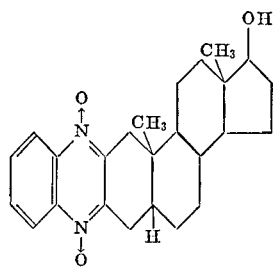

2.72 g. (0.02 mol) of benzofurazane-N-oxide are dissolved in 40 cc. of warm methanol together with 5.80 g. (0.02 mol) of dihydrotestosterone, and 2.2 g. (0.03 mol) of butylamine in 5 cc. of methanol are added dropwise. The temperature of the solution rises to about 60° C. and attains a deep red colouration. When the heat of reaction has been dissipated, the reaction mixture is heated on a water bath to 50° C. and this temperature is maintained for 3 hours. Separation of crystals commences after about 30 minutes. The precipitate is filtered off under suction and is recrystallised from dimethylformamide/methanol. 5.9 g. (=67% of the theoretical) of the compound of the above structural formula are obtained as pale yellow crystals which melt with decomposition at 235° C. The substance crystallises with 1 mol of methanol of crystallisation.

Analysis.—$C_{25}H_{34}N_2O_3$ (440). Cal. (percent): C, 70.98; H, 8.20; N, 6.36; O, 14.51. Found (percent): C, 70.84; H, 8.43; N, 6.55; O, 14.71.

EXAMPLE 64

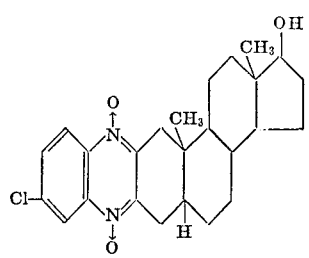

2.90 g. (0.01 mol) of dihydrotestosterone are dissolved in 25 cc. of methanol at elevated temperature together with 1.72 g. of 5-chloro-benzofurazane-N-oxide (0.01 mol) and 1.1 g. (0.011 mol) of cyclohexylamine are added dropwise. As a result of this addition, the temperature of the solution rises and the solution becomes deep red in colour. The temperature of the solution is maintained at 50° C. for 5 hours and the solution is left to stand in the cold for some hours. 2.0 g. (=42.5% of the theoretical) of the compound of the above structural formula separate out as yellow crystals which melt at 253° C. with decomposition after recrystallisation from dimethylformamide/methanol. The substance crystallises with 1 mol of methanol of crystallisation.

Analysis.—$C_{25}H_{31}ClN_2O_3 \cdot CH_3OH$ (474.5). Cal. (percent): C, 65.80; H, 7.39; Cl, 7.49. Found (percent): C, 66.07; H, 7.43; Cl, 7.60.

EXAMPLE 65

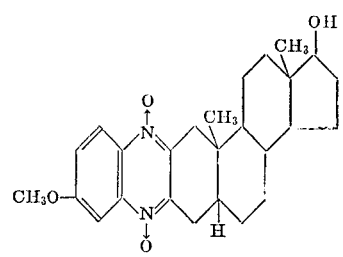

3.32 g. (0.02 mol) of 5-methoxy-benzofurazane-N-oxide are dissolved in 40 cc. of ethanol (96%) together with 5.80 g. (0.02 mol) of dihydrotestosterone, and 2.5 g. of butylamine in 5 cc. of ethanol are added dropwise. The temperature of the solution consequently heats up to about 50° C. It is stirred for another 5 hours at this temperature and is then left to stand in the cold for some hours. 5.0 g. (=53% of the theoretical) of the compound of the above structural formula separate out in the form of yellow crystals which melt at 230° C. with decomposition after recrystallisation from dimethylformamide/ethanol. The substance crystallises with 2 mols of water of crystallisation.

Analysis.—$C_{26}H_{34}N_2O_4 \cdot 2H_2O$ (474). Cal. (percent): C, 65.80; H, 8.03; N, 5.92. Found (percent): C, 65.59; H, 8.36; N, 6.08.

EXAMPLE 66

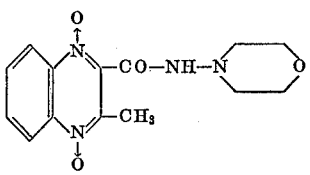

50 g. (0.29 mol) of acetoacetic acid-N-morpholinylamide are dissolved in 150 cc. of methanol together with 40 g. (0.29 mol) of benzofurazane-N-oxide, and ammonia is passed through for 4 hours at 45 to 50° C. After the reaction mixture has been left to stand for 2 hours at room temperature, 18 g. (=20% of the theoretical) of 2-methyl-quinoxaline-di-N-oxide-(1,4)-3-carboxylic acid N-morpholinylamide separate out as pale yellow crystals which melt at 204 to 205° C. with decomposition after recrystallisation from ethyl acetate.

Analysis.—$C_{14}H_{16}N_4O_4$ (304). Cal. (percent): C, 55.60; H, 5.26; N, 18.42. Found (percent): C, 54.64; H, 5.34; N, 19.82.

EXAMPLE 67

94 g. (0.5 mol) of O-phenyl-acetoacetate are dissolved in 250 cc. of ethanol together with 68 g. (0.5 mol) of benzofurazane-N-oxide and the solution is saturated with ammonia at 50° C. The reaction mixture is then stirred for another 3 hours while further ammonia is slowly introduced at 50 to 60° C., and the reaction mixture is then cooled. 36 g. (=33% of the theoretical) of 2-methyl-quinoxaline-di-N-oxide-(1,4)-3-carboxylic acid amide separate out as colourless crystals which melt at 245° C. with decomposition after recrystallisation from dimethylformamide.

Analysis.—$C_{10}H_9N_3O_3$ (219). Cal. (percent): C, 54.90; H, 4.10; N, 19.20. Found (percent): C, 54.92; H, 4.00; N, 19.56.

EXAMPLE 68

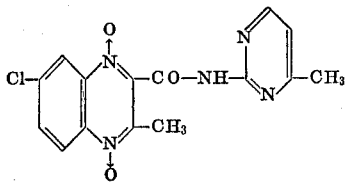

70 g. (0.36 mol) of aceto-acetic acid-N-[2-(4-methylpyrimidinyl)]-amide are dissolved in 200 cc. of methanol at 40° C. together with 62 g. (0.36 mol) of 5-chlorobenzofurazane-N-oxide, and 29 g. (0.4 mol) of butylamine are added dropwise with cooling at 40 to 45° C. The reaction mixture is then stirred for another 3 hours at 50° C. and then cooled. 25 g. (=20% of the theoretical) of 2-methyl-7-chloro-quinoxaline-di-N-oxide-(1,4)-3-carboxylic acid-N-[2-(4'-methyl-pyrimidinyl)]-amide separate out as pale yellow crystals which melt at 220° C. with decomposition after recrystallisation from dimethylformamide.

Analysis.—$C_{15}H_{12}ClN_5O_3$ (345.5). Cal. (percent): C, 52.20; H, 3.58; N, 20.30. Found (percent): C, 52.25; H, 3.78; N, 20.09.

EXAMPLE 69

60 g. (0.25 mol) of acetoacetic acid (2-benzothiazolyl)-amide are suspended, together with 35 g. (0.25 mol) of benzofurazane-N-oxide, in a mixture of 200 cc. of methanol and 50 cc. of dimethylformamide at 50° C., and ammonia is passed through the solution while it is stirred, all the reactants passing into the solution. Introduction of ammonia is continued for 3 hours and the reaction mixture is then cooled. 40.5 g. (=45% of the theoretical) of 2-methyl-quinoxaline-di-N-oxide-(1,4)-3-carboxylic acid-(2'-benzothiazolyl)-amide separate out in the form of yellow crystals which melt at 222° C. with decomposition after recrystallisation from dimethylformamide.

Analysis.—$C_{17}H_{12}N_4O_3S$ (352). Cal. (percent): C, 57.90; H, 3.41; S, 9.10. Found (percent): C, 57.51; H, 3.68; S, 9.25.

EXAMPLE 70

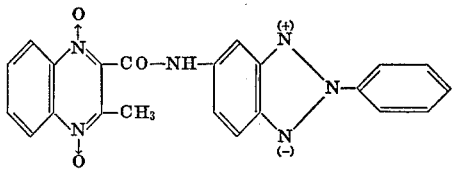

105 g. (0.5 mol) of acetoacetic acid N-[5-(2-phenylbenzo-1,2,3-triazolyl)]-amide are suspended in a solution of 68 g. (0.5 mol) of benzofurazane-N-oxide in a mixture of 300 cc. of methanol and 100 cc. of dimethylformamide at 40° C., and ammonia is passed through. During this operation, the temperature is maintained at 40 to 45° C. by slight cooling. The amide slowly dissolves. The reaction mixture is then stirred for another 6 hours at 40 to 45° C. 36 g. (=17.5% of the theoretical) of 2-methyl-quinoxaline-di-N-oxide-(1,4)-3-carboxylic acid N-[5'-(2'-phenyl-1',2',3'-benzotriazolyl)]-amide separate out in the form of yellow crystals which, after recrystallisation from dimethylformamide, melt at 224 to 225° C. with decomposition.

Analysis.—$C_{22}H_{16}N_6O_3$ (412). Cal. (percent): C, 64.10; H, 3.89; N, 20.19. Found (percent): C, 63.93; H, 4.04; N, 20.22.

EXAMPLE 71

30 g. (0.17 mol) of acetoacetic acid N-(2-pyridinyl)-amide are dissolved in 100 cc. of benzene together with 23 g. of benzofurazane-N-oxide (0.17 mol). 20 g. (0.2 mol) of cyclohexylamine are then added and the reaction mixture is stirred for 4 hours at 40 to 45° C. When the reaction mixture has been left to stand for several hours, 22 g. (=34% of the theoretical) of 2-methyl-quinoxaline-di-N-oxide-(1,4)-3-carboxylic acid-N-[(2'-pyridinyl)]-amide separate out in the form of pale yellow crystals which, after recrystallisation from dimethylformamide/methanol melt at 218° C. with decomposition.

Analysis.—$C_{15}H_{12}N_4O_3$ (296). Cal. (percent): C, 60.80; H, 4.06; N, 18.92. Found (percent): C, 60.26; H, 4.29; N, 19.98.

EXAMPLE 72

102.5 g. of acetoacetic acid 2,6-dimethylanilide (0.5 mol) are dissolved in 250 cc. of benzene together with 68 g. (0.5 mol) of benzofurazane-N-oxide and 75 g. (0.75 mol) of cyclohexylamine are then added and the reaction mixture is heated for 2 hours at 70° C. 118 g. (=72.5% of the theoretical) of 2-methyl-quinoxaline-di-N-oxide-(1,4)-3-carboxylic acid-(2',6'-dimethyl) anilide separate out as pale yellow crystals which, after washing with methanol and recrystallisation from dimethyl formamide, melt at 234° C. with decomposition.

*Analysis*.—C₁₈H₁₇N₃O₃ (323). Cal. (percent): C, 66.9; H, 5.26; N, 13.0. Found (percent): C, 65.2; H, 5.22; N, 12.8.

EXAMPLE 73

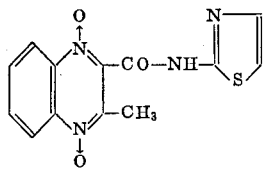

20 g. (0.075 mol) of 2-cyclohexylidene-butyric acid-N-(2-thiazolyl-amide)-amine (=Schiff's base from cyclohexylamine and acetoacetic acid-N-2-thiazolyl-amide) are dissolved in 80 cc. of ethanol together with 11 g. (0.075 mol) of benzofurazane-N-oxide and heated to boiling for 4 hours. 10 g. (=33% of the theoretical) of 2-methyl-quinoxaline-di-N-oxide-(1,4)-3-carboxylic acid-N-[2'-thiazolyl]-amide separate out on cooling as yellow crystals which melt at 212 to 213° C. with decomposition after recrystallisation from dimethylformamide.

*Analysis*.—C₁₃H₁₀N₄SO₃ (302). Cal. (percent): C, 51.75; H, 3.31; N, 18.54; S, 10.60. Found percent): C, 51.88; H, 3.99; N, 18.27; S, 10.65.

EXAMPLE 74

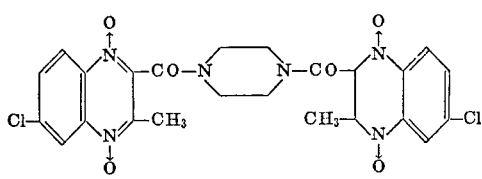

135 g. (0.4 mol) of N,N'-di-acetoacetyl-piperazine are dissolved in 400 cc. of methanol together with 170 g. (0.8 mol) of 5-chloro-benzofurazane-N-oxide and 80 g. (0.44 mol) of butylamine are then added dropwise with stirring at 45 to 50° C. The reaction mixture is stirred for another 3 hours at 50° C. and is then cooled. 180 g. (=65.5% of the theoretical) of N,N'-di-[2-methyl-7-chloro-quinoxaline-di-N-oxide-(1,4)-3-carboxylic acid]-piperazide separate out in the form of yellow crystals which melt at 256° C. with decomposition after recrystallisation from boiling dimethylformamide. The substance crystallises with 2 mols of water of crystallisation.

*Analysis*.—C₂₄H₂₀Cl₂N₆O₆·2H₂O (595). Cal. (percent): C, 49.40; H, 4.03; N, 14.12. Found (percent): C, 49.04; H, 4.43; N, 14.10.

EXAMPLE 75

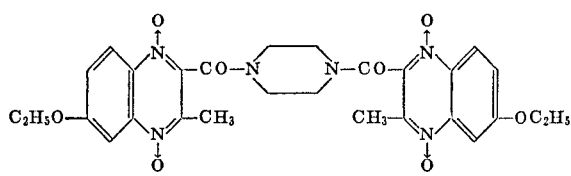

50.8 g. (0.2 mol) of N,N'-di-acetoacetyl-piperazine are dissolved in 300 cc. of methanol together with 72 g. (0.4 mol) of 5-ethoxybenzofurazane-N-oxide, and 35 g. (0.48 mol) of butylamine are then added dropwise at 50° C. The reaction mixture is stirred for 3 hours at 50 to 60° C. and the precipitate which separates out is then removed by filtration under suction. By boiling with dimethylformamide, 97 g. (=84% of the theoretical) of N,N'-di-[2-methyl-7-ethoxy-quinoxaline-di - N - oxide - (1,4) - 3 - carboxylic acid]-piperazide are obtained as yellow crystals which melt at 267° C. with decomposition.

*Analysis*.—C₂₈H₃₀N₆O₈ (578.5). Cal. (percent): C, 58.10; H, 5.22; N, 14.52; O, 22.15. Found (percent): C, 57.79; H, 5.48; N, 14.41; O, 22.68.

EXAMPLE 76

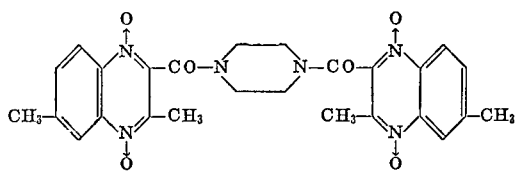

50.8 g. (0.2 mol) of N,N'-di-acetoacetyl-piperazine are dissolved in 300 cc. of methanol together with 60.8 g. (0.5 mol) of 5-methyl-benzofurazane-N-oxide, and 35 g. of butylamine (0.48 mol) are then added dropwise with stirring at 50° C. After stirring for a further 2 hours at 50° C., the reaction mixture is filtered under suction, and, after washing with dimethylformamide, 92 g. (=85% of the theoretical) of N,N'-(di-[2,7-dimethyl-quinoxaline-di-N-oxide-(1,4)-3-carboxylic acid])-piperazide are obtained as yellow crystals which melt at 250° C. with decomposition after recrystallisation from dimethylformamide.

*Analysis*.—C₂₆N₆O₈·H₂O (558.5). Cal. (percent): C, 55.9; H, 5.01; N, 15.05. Found (percent): C, 55.8; H, 5.9; N, 15.1.

EXAMPLE 77

27.2 g. (0.2 mol) of benzofurazane-N-oxide are dissolved in 150 cc. of methanol together with 36.8 g. (0.2 mol) of acetoacetic acid-cyclohexylamide, and 16 g. (0.22 mol) of butylamine are then added dropwise at 50° C. The reaction mixture is cooled after reaction has proceeded for 2 hours at 50° C. 41 g. (=68% of the theoretical) of 2-methyl-quinoxaline-di-N-oxide-(1,4)-3-carboxylic acid-cyclohexylamide, separate out as yellow crystals which melt at 205° C. after recrystallisation from ethanol.

*Analysis*.—C₁₆H₁₉N₃O₃ (301). Cal. (percent): C, 63.80; H, 6.42; N, 13.95. Found (percent): C, 63.98; H, 6.60; N, 13.89.

EXAMPLE 78

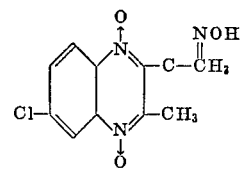

58.5 g. (0.5 mol) of 2-oximino-pentanone-3 are dissolved in 250 cc. of methanol together with 85 g. (0.5 mol) of 5-chlorobenzofurazane-N-oxide, and ammonia is passed therethrough for 3 hours at 50° C. The yellow-green precipitate which separates off is filtered under suction, dissolved in 10% sodium hydroxide solution and filtered, and the filtrate is then neutralised with acetic acid. 98 g. (=73.5% of the theoretical) of 2-methyl-7-chloro-3-(1'-oximino-ethyl)-quinoxaline-di-N-oxide-(1,4) separate out as yellow crystals which melt at 222 to 223° C. after recrystallisation from dimetyhlformamide/acetonitrile.

*Analysis*.—C₁₁H₁₀ClN₃O₃ (267). Cal. (percent): C, 49.40; H, 3.89; Cl, 13.30; N, 15.72. Found (percent): C, 49.04; H, 3.86; Cl, 12.85; N, 15.01.

EXAMPLE 79

58.5 g. (0.5 mol) of 2-oximino-pentanone-3 are dissolved in 300 cc. of methanol at 50 C. together with 68 g. (0.5 mol) of benzofurazane-N-oxide, and ammonia is passed through the solution for 4 hours at this temperature. 68 g. (=58.5% of the theoretical) of 2-methyl-3-(1'-imino-ethyl)-quinoxaline-di-N-oxide-(1,4) separate out as yellow crystals. These are purified by dissolving them in 10% sodium hydroxide solution, filtration and reprecipitation in acetic acid, followed by crystallisation from dimethylformamide/methanol. Yellow crystals, M.P. 219° C., with decomposition are obtained.

Analysis.—$C_{11}H_{11}N_3O_3$ (233). Cal. (percent): C, 56.65; H, 4.73; N, 18.02. Found (percent): C, 56.58; H, 4.83; N, 18.65.

EXAMPLE 80

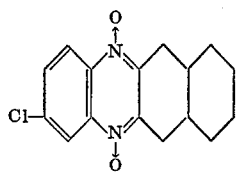

15.2 g. (0.1 mol) of cis-decalone-2 are dissolved in 100 cc. of methanol together with 17 g. (0.1 mol) of 5-chloro-benzofurazane-N-oxide and 10 g. (0.13 mol) of butylamine are added dropwise at 40 to 45° C. The reaction proceeds exothermally, and separation of crystals begins after a short time. The reaction mixture is then stirred for a further hour at 45° C., is cooled and is then filtered under suction. After recrystallisation from dimethylformamide, 15 g. (=42% of the theoretical) of 7-chloro-2,3-(2',3'-decahydro-naphtho)-quinoxaline-di-N-oxide are obtained as yellow crystals which melt at 202 to 204° C. The compound crystallises with 1 mol of dimethylformamide of crystallisation.

Analysis. — $C_{16}H_{17}ClN_2O_2 \cdot HCON(CH_3)_2$ (361.5). Cal. (percent): C, 63.3; H, 6.09; Cl, 9.95; N, 11.9. Found (percent): C, 63.8; H, 5.92; Cl, 9.95; N, 11.9.

EXAMPLE 81

27.2 g. (0.2 mol) of benzofurazane-N-oxide are dissolved in 100 cc. of methanol together with 35.6 g. (0.2 mol) of benzoyl propionic acid and the solution is heated at 50 to 60° C. while ammonia is passed through for 3 hours. $CO_2$ is evolved during the reaction. After cooling, the reaction product is filtered under suction and washed with methanol. 36 g. (=72% of the theoretical) of 2-methyl-3-phenyl-quinoxaline-di-N-oxide are obtained in the form of yellow crystals which melt at 194 to 196° C. after recrystallisation from dimethylformamide.

Analysis.—$C_{15}H_{12}N_2O_2$ (252). Cal. (percent): C, 71.40; H, 4.76; N, 11.12. Found (percent): C, 70.79; H, 4.93; N, 11.05.

EXAMPLE 82

59.5 g. (0.35 mol) of 5-chloro-benzofurazane-N-oxide are dissolved in 200 cc. of methanol together with 56.5 g. (0.35 mol) of benzoylpropionic acid, and ammonia is passed through the solution for 4 hours at 50 to 60° C. Carbon dioxide is evolved and yellow crystals separate out. These are removed by filtration under suction and are washed with methanol. 70 g. (=77% of the theoretical) of 2-methyl-3-phenyl-7-chloro-quinoxaline-di-N-oxide are obtained as yellow crystals, which melt at 162 to 163° C. after recrystallisation from ethanol.

Analysis.—$C_{15}H_{11}ClN_2O_2$ (286.7). Cal. (percent): C, 62.90; H, 3.85; Cl, 12.38; N, 9.78. Found (percent): C, 62.94; H, 4.20; Cl, 12.15; N, 9.86.

EXAMPLE 83

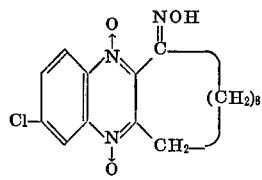

50 g. (0.237 mol) of 2-oximino-cyclododecanone-1 (colourless crystals of M.P. 73 to 75° C. obtained by introduction of a nitroso group into cyclododecanone) are dissolved in 200 cc. of methanol at 50° C., together with 40 g. (0.237 mol) of 5-chlorobenzofurazane-N-oxide, and ammonia is passed through the solution at this temperature for 5 hours. The solvent is then distilled off in vacuo and the viscous brown residue is taken up in 200 cc. of benzene and mixed with 200 cc. of 10% NaOH. The sodium salt of 2,3-[1'-oximino-cyclodecylene-2',3']-7-chloro-quinoxaline-di-N-oxide-(1,4) separates out as a yellow powder. This is separated from the liquid phases by filtration under suction and is dissolved in methanol and filtered. The sodium salt recrystallises in the form of yellow crystals on the addition of acetone to the filtrate. Yield: 47 g. (=37% of the theoretical). The free oxime is obtained by dissolving the sodium salt in water and acidifying with acetic acid as pale yellow crystals which melt at 197 to 199° C. after recrystallisation from methanol.

Analysis.—$C_{18}H_{22}ClN_3O_3$ (363.7). Cal. (percent): C, 59.50; H, 6.06; Cl, 9.77; N, 11.58. Found (percent): C, 59.99; H, 6.21; Cl, 9.25; N, 11.26.

EXAMPLE 84

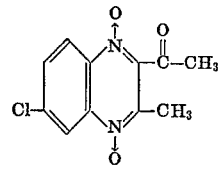

170 g. (1 mol) of 5-chloro-benzofurazane-N-oxide are dissolved in 400 cc. of ethanol, 150 g. (1.5 mols) of acetylacetone are added and 19 g. (1.1 mols) of ammonia are passed through the reaction mixture which is heated to 40 to 50° C. at the same time. The reaction mixture is then stirred for another 2 hours and cooled and the precipitate which forms is filtered off under suction. 145 g. (=57.5% of the theoretical) of 2-methyl-3-acetyl-7-chloroquinoxaline-di-N-oxide are obtained as yellow crystals which melt at 170 to 171° C. after recrystallisation from methylformamide.

Analysis.—$C_{11}H_9ClN_2O_3$ (252.5). Cal. (percent): C, 52.50; H, 3.57; N, 11.10; Cl, 14.05. Found (percent): C, 51.64; H, 3.66; N, 11.01; Cl. 14.00.

EXAMPLE 85

124 g. (0.71 mol) of 5-ethoxy-benzofurazane-N-oxide are dissolved in 500 cc. of ethanol together with 71 g. (0.71 mol) of acetylacetone, and ammonia is passed through for 4 hours at 50 to 60° C. Yellow crystals separate while the reaction mixture is still warm. The reaction mixture is filtered under suction and 80 g. (=43% of the theoretical) of 2-methyl-3-acetyl-7-ethoxy-quinoxaline-di-N-oxide are obtained as yellow crystals which melt at 178 to 180° C. after recrystallisation from dimethylformamide.

Analysis.—$C_{13}H_{14}N_2O_4$ (262). Calculated (percent): C, 59.60; H, 5.35; N, 10.69. Found (percent): C, 59.53; H, 5.56; N, 10.55.

EXAMPLE 86

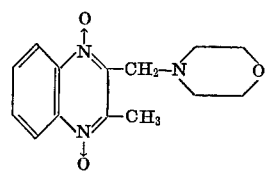

68 g. (0.5 mole) of benzofurazane-N-oxide are dissolved in 250 cc. of methanol together with 78.5 g. (0.5 mol) of 1-(N-morpholinyl)-butanone-(3), and ammonia is passed through the solution for 4 hours at 35 to 40° C. 95 g. (=69% of the theoretical) of 2-methyl-3-(N-morpholinyl)-methyl-quinoxaline-di-N-oxide-(1,4) separate out as pale yellow crystals which melt at 138 to 139° C. after recrystallisation from isopropanol.

Analysis.—$C_{14}H_{17}N_3O_3$ (275). Calculated (percent): C, 61.2; H, 6.19; N, 15.29. Found (percent): C, 61.6; H 6.45; N, 15.32.

EXAMPLE 87

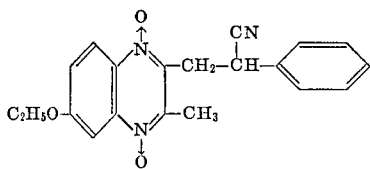

31.4 g. (0.2 mol) of 5-ethoxy-benzofurazane-N-oxide are dissolved in 100 cc. of methanol together with 37.4 g. (2 mol) of 1-phenyl-1-cyano-pentanone-4, and ammonia is passed through the solution for 4 hours at 45 to 50° C. 26 g. (=37.4% of the theoretical) of 2-methyl-3-[1'-(2'-phenyl-2'-cyanoethyl)] - 7 ethoxy-quinoxaline-di-N-oxide-(1,4) separate out as yellow crystals which melt at 172 to 173° C. after recrystallisation from dimethylformamide/ethanol.

Analysis.—$C_{20}H_{19}N_3O_3$ (349). Calculated (percent): C, 68.80; H, 5.45; N, 12.03. Found (percent): C, 68.68; H, 5.40; N, 12.16.

EXAMPLE 88

27.2 g. (0.2 mol) of benzofurazane-N-oxide and 8.8 g. (0.2 mol) of acetaldehyde are dissolved in 200 ml. of methylene chloride. 40 g. of potassium carbonate are added and 14.6 g. (0.2 mol) of butylamine are slowly added dropwise to the reaction mixture which is stirred at room temperature for 5 hours. After removal of the potassium carbonate by filtration, the methylene chloride solution is concentrated by evaporation in vacuo. The residue is mixed with isopropanol and stirred and is then filtered off under suction. 8 g. (=24.7% of the theoretical) of quinoxaline-di-N-oxide are obtained as pale yellow crystals which melt at 241° C. after recrystallisation from water.

Analysis.—$C_8H_6N_2O_2$ (mol wt. 162). Calculated (percent): C, 59.25; H, 3.70; N, 17.28. Found (percent): C, 59.38; H, 3.55; N, 17.30.

EXAMPLE 89

13.6 g. (0.1 mol) of benzofurazane-N-oxide and 7.3 g. (0.1 mol) of butylamine are dissolved in 100 ml. of methylene chloride. 20 g. of potassium carbonate are then added and 5.8 g. (0.1 mol) of propionaldehyde are added slowly drop by drop to the reaction mixture which is then stirred for 5 hours at room temperature. After removal of potassium carbonate by filtration, the methylene chloride solution is concentrated by evaporation in vacuo. The residue is taken up in isopropanol and is filtered under suction. 12 g. (=68.2% of the theoretical) of 2-methyl-quinoxaline-di-N-oxide which melts at 181° C. after recrystallisation from alcohol are obtained.

Analysis.—$C_9H_8N_2O_2$ (mol. wt. 176.) Calculated (percent): C, 61.3; H, 4.54; N, 15.85; O, 18.19. Found (percent): C, 61.2; H, 4.68; N, 15.98; O, 18.22.

EXAMPLE 90

13.6 g. (0.1 mol) of benzofurazane-N-oxide and 7.2 g. (0.1 mol) of butyraldehyde are dissolved in 100 ml. of ethanol, and 9.9 g. (0.1 mol) of cyclohexylamine are added dropwise. After 5 hours the reaction mixture is filtered under suction, and 10 g. (=52.6% of the theoretical) of 2 - ethyl-quinoxaline-di-N-oxide are obtained as yellow brown crystals which melt at 148 to 152° C. after recrystallisation from ethanol.

Analysis.—$C_{10}H_{10}N_2O_2$ (mol. wt. 190). Calculated (percent): C 63.0; H, 5.25; N, 14.7. Found (percent): C, 62.73; H, 5.37; N, 15.86.

EXAMPLE 91

13.6 g. (0.1 mol) of benzofurazane-N-oxide and 11.4 g. (0.1 mol) of oenanthaldehyde are dissolved in 100 ml. of ethanol, and 7.3 g. (0.1 mol) of butylamine are slowly added dropwise. The reaction mixture is stirred for another 5 hours at 50° C., and is then cooled to +5° C. and filtered under suction. 7 g. (=30.1% of the theoretical) of 2 - n-pentyl-quinoxaline-di-N-oxide are obtained as yellow crystals which melt at 99 to 100° C. after recrystallisation from ethanol.

Analysis.—$C_{13}H_{16}N_2O_2$ (mol. wt. 232). Calculated (percent): C, 67.2; H, 6.9; N, 12.08. Found (percent): C, 66.93; H, 7.13; N, 12.02.

EXAMPLE 92

13.6 g. (0.1 mol) of benzofurazane-N-oxide and 13.4 g. of dihydrocinnamic aldehyde (0.1 mol) are dissolved in 100 ml. of ethanol. 7.3 g. of n-butylamine are slowly added dropwise to this solution which is then stirred for another 5 hours at 50° C. after cooling to about 5° C. and filtering under suction. 7 g. (=25.9% of the theoretical) of 2-benzyl-quinoxaline-di-N-oxide are obtained as yellow crystals which melt at 183° C. after recrystallisation from dioxane/ethanol.

Analysis.—$C_{15}H_{12}N_2O_2$ (mol. wt. 252). Calculated (percent): C, 71.4; H, 4.76; N, 11.1. Found (percent): C, 70.99; H, 5.05; N, 11.09.

EXAMPLE 93

13.6 g. (0.1 mol) of benzofurazane-N-oxide and 26.8 g. (0.1 mol) of a 50% solution of 4-methylphenyl-acetaldehyde in dimethyl phthalate are dissolved in 100 ml. of ethanol and 7.3 g. of n-butylamine are added slowly. After 2 hours, the reaction mixture is filtered under suction, and 20 g. (=79.3% of the theoretical) of 2-(4'-methylphenyl)-quinoxaline-di-N-oxide are obtained as yellow crystals which melt at 198 to 201° C. after recrystallisation from dioxane.

Analysis.—$C_{15}H_{22}N_2O_2$ (mol. wt. 252). Calculated (percent): C, 71.4; H, 4.76; N, 11.1. Found (percent): C, 71.22; H, 4.70; N, 11.07.

EXAMPLE 94

13.6 g. (0.1 mol) of benzofurazane-N-oxide and 5.8 g. (0.1 mol) of propionaldehyde are dissolved in 75 ml. of tetrahydrofuran. $NH_3$ is slowly passed through the reaction mixture for 5 hours at 50° C. After cooling and filtration under suction 5 g. (=28.4% of the theoretical) of 2-methyl-quinoxaline-di-N-oxide which melts at 181° C. after recrystallisation from ethanol are obtained.

EXAMPLE 95

15.0 g. (0.1 mol) of 5-methyl-benzofurazane-N-oxide and 5.8 g. (0.1 mol) of propionaldehyde are dissolved in 100 ml. of ethanol, and 9.9 g. (0.1 mol) of cyclohexylamine are added slowly. After 5 hours, the reaction mixture is cooled to about +5° C. and 10 g. (52.6% of the theoretical) of 2,6-dimethyl-quinoxaline-di-N-oxide are obtained as yellow crystals which melt at 185 to 186° C. after recrystallisation from alcohol.

Analysis.—$C_{10}H_{10}N_2O_2$ (mol. wt. 190). Calculated (percent): C, 63.2; H, 5.36; N, 14.73. Found (percent): C, 63.03; H, 5.63; N, 14.65.

EXAMPLE 96

15 g. (0.1 mol) of 5-methyl-benzofurazane-N-oxide and 7.2 g. (0.1 mol) of n-butyraldehyde are dissolved in 100 ml. of ethanol 9.9 g. (0.1 mol) of cyclohexylamine are added dropwise to this solution and the reaction mixture is then stirred for 5 hours after which it is cooled to about +5° C. 11 g. (54% of the theoretical) of 2-ethyl-6-methyl-quinoxaline-di-N-oxide are obtained as yellow crystals which melt at 147 to 150° C. after recrystallisation from ethanol.

Analysis.—$C_{21}H_{12}N_2O_2$ (mol. wt. 204). Calculated percent): C, 64.6; H, 5.88; N, 13.73. Found (percent): C, 63.55; H, 5.99; N, 13.9.

EXAMPLE 97

15 g. (0.1 mol) of 5-methyl-benzofurazane-N-oxide and 11.4 g. (0.1 mol) of oenanthaldehyde are dissolved in 100 ml. of ethanol 9.9 g. (0.1 mol) of cyclohexylamine are added dropwise and the reaction mixture is stirred for 5 hours. It is then cooled to about +5° C. and 9 g. (=36.6% of the theoretical) of 2-n-pentyl-6-methyl-quinoxaline-di-N-oxide are obtained as yellow crystals which melt at 120–123° C. after recrystallisation from ethanol.

Analysis.—$C_{14}H_{18}N_2O_2$ (mol. wt. 246). Calculated (percent): C, 68.3; H, 7.33; N, 11.38. Found (percent): C, 67.56; H, 7.54; N, 11.11.

EXAMPLE 98

15 g. (0.1 mol) of 5-methyl-benzofurazane-N-oxide and 26.8 g. (0.1 mol) of a 50% solution of 4-methyl-phenylacetaldehyde in dimethylphthalate are dissolved in 100 ml. of ethanol. 7.3 g. (0.1 mol) of butylamine are added dropwise and, after 5 hours, the reaction mixture is cooled to about +5° C. and 17 g. (=64% of the theoretical) of 2-(4'-methylphenyl)-6-methyl-quinoxaline-di-N-oxide are obtained as yellow crystals which, after recrystallisation from ethanol, melt at 161 to 165° C.

Analysis.—$C_{16}H_{14}N_2O_2$ (mol. wt. 266). Calculated (percent): C, 72.2; H, 5.26; N, 10.5. Found (percent): C, 72.19; H, 5.66; N, 10.33.

EXAMPLE 99

24 g. (0.16 mol) of 5-methyl-benzofurazane-N-oxide are dissolved in 100 ml. of benzene, and 22.6 g. (0.2 mol) of n-propylidene-n-butylamine are added. After stirring for 5 hours at 40° C. and filtration under suction after cooling to room temperature 9 g. (23.7% of the theoretical) of 2,6-dimethyl-quinoxaline-di-N-oxide are obtained as yellow crystals which melt at 185 to 186° C. after recrystallisation from ethanol.

EXAMPLE 100

16.6 g. (0.1 mol) of 5-methoxy-benzofurazane-N-oxide and 5.8 g. (0.1 mol) of propionaldehyde are dissolved in 100 ml. of ethanol. 9.9 g. (0.1 mol) of cyclohexylamine are slowly added dropwise and the reaction mixture is stirred for 5 hours. After cooling to about +5° C., the reaction mixture is filtered under suction, and 16 g. (=77.7% of the theoretical) of 2-methyl-6-methoxy-quinoxaline-di-N-oxide are obtained as yellow crystals which melt at 206 to 208° C. after recrystallisation from water.

Analysis.—$C_{10}H_{10}N_2O_3$ (mol. wt. 206). Calculated (percent): C, 58.2; H, 4.85; N, 13.59. Found (percent): C, 58.17; H, 5.10; N, 13.70.

EXAMPLE 101

16.6 g. (0.1 mol) of 5-methoxy-benzofurazane-N-oxide and 7.2 g. (0.1 mol) of n-butyraldehyde are dissolved in 100 ml. of ethanol and 7.3 g. (0.1 mol) of n-butylamine are slowly added. After 5 hours, the reaction mixture is cooled to about +5° C., and 10 g. (=45.5% of the theoretical) of 2-ethyl-6-methoxy-quinoxaline-di-N-oxide are obtained as yellow crystals which, after recrystallisation from ethanol melt at 171 to 174° C.

Analysis.—$C_{11}H_{12}N_2O_3$ (mol. wt. 220). Calculated (percent): C, 60.00; H, 5.46; N, 12.72. Found (percent): C, 59.85; H, 6.06; N, 12.53.

EXAMPLE 102

16.6 g. (0.1 mol) of 5-methoxy-benzofurazane-N-oxide are dissolved in 100 ml. of benzene, and 12.7 g. (0.1 mol) of n-butylidene-n-butylamine are added slowly and the reaction mixture is then stirred for 5 hours. After filtration under suction, 6 g. (=36.7% of the theoretical) of 2-ethyl-6-methoxy-quinoxaline-di-N-oxide are obtained as yellow crystals which, after recrystallisation from ethanol melt at 171 to 174° C.

EXAMPLE 103

16.6 g. (0.1 mol) of 5-methoxy-benzofurazane-N-oxide and 11.4 g. (0.1 mol) of oenanthaldehyde are dissolved in 100 ml. ethanol, and 9.9 g. (0.1 mol) of cyclohexylamine are then added dropwise. The reaction mixture is stirred for 5 hours and then cooled to about +5° C. and filtered. 15 g. (57.2% of the theoretical) of 2-n-pentyl-6-methoxy-quinoxaline-di-N-oxide are obtained as yellow crystals which, after recrystallisation from alcohol, melt at 140 to 142° C.

Analysis.—$C_{14}H_{18}N_2O_3$ (mol. wt. 262). Calculated (percent): C, 64.1; H, 6.86; N, 10.68. Found (percent): C, 63.82; H, 6.86; N, 10.66.

EXAMPLE 104

16.6 g. (0.1 mol) of 5-methoxy-benzofurazane-N-oxide and 26.8 g. (0.1 mol) of a 50% solution of 4-methyl-phenyl-acetaldehyde in dimethylphthalate are dissolved in 100 ml. ethanol, and 7.3 g. (0.1 mol) of n-butylamine are slowly added. After 5 hours, the reaction mixture is cooled to about +5° C., and 18.0 g. (=63.8% of the theoretical) of 2-(4'-methylphenyl)-6-methoxy-quinoxaline-di-N-oxide are obtained as yellow crystals which, after recrystallisation from ethanol, melt at 197 to 199° C.

Analysis.—$C_{16}H_{14}N_2O_3$ (mol. wt. 282). Calculated (percent): C, 68.1; H, 4.93; N, 9.86. Found (percent): C, 68.97; H, 5.52; N, 9.83.

EXAMPLE 105

Ammonia is passed for 5 hours into a solution of 17 g. (0.1 mol) of 5-chloro-benzofurazane-N-oxide and 5.8 g. (0.1 mol) of propionaldehyde in 100 ml. of ethanol. During this time, the temperature remains between 40 and 50° C. The reaction mixture is then cooled to about +5° C. and is filtered under suction. 8 g. (36.4% of the theoretical) of 2-methyl-6-chloro-quinoxaline-di-N-oxide are obtained as yellow crystals which, after recrystallisation from ethanol, melt at 185 to 190° C.

Analysis.—$C_9H_7ClN_2O_2$ (mol. wt. 210.5). Calculated (percent): C, 51.2; H, 3.33; N, 13.30. Found (percent): C, 51.52; H, 3.59; N, 13.08.

EXAMPLE 106

17.0 g. (0.1 mol) of 5-chloro-benzofurazane-N-oxide and 7.2 g. of n-butyraldehyde are dissolved in 100 ml. of ethanol, and 9.9 g. (0.1 mol) of cyclohexylamine are slowly added, the temperature rising as a result to 60° C. The reaction mixture is then stirred for 5 hours and is cooled to about +5° C. and filtered. 9 g. (=40% of the theoretical) of 2 - ethyl-6-chloro-quinoxaline-di-N-oxide are obtained as yellow crystals which after recrystallisation from ethanol melt at 114° C.

Analysis.—$C_{10}H_9ClN_2O_2$ (mol. wt. 224.5). Calculated (percent): C, 53.49; H, 4.01; N, 12.47. Found (percent): C, 53.64; H, 4.29; N, 12.38.

EXAMPLE 107

17.0 g. (0.1 mol) of 5-chloro-benzofurazane-N-oxide and 11.4 g. (0.1 mol) of oenanthaldehyde are dissolved in 100 ml. of ethanol, and 9.9 g. (0.1 mol) of cyclohexylamine are added slowly. After 5 hours, the reaction mixture is cooled to about +5° C. and 15 g. (56.3% of the theoretical) of 2-n-pentyl-6-chloroquinoxaline-di-N-oxide are obtained as yellow crystals which, after recrystallisation from ethanol melt at 130 to 131° C.

Analysis.—$C_{13}H_{15}ClN_2O_2$ (mol. wt. 266.5). Calculated (percent): C, 58.5; H, 5.63; N, 10.51. Found (percent): C, 58.37; H, 5.36; N, 10.64.

EXAMPLE 108

17.0 g. (0.1 mol) of 5-chloro-benzofurazane-N-oxide and 26.8 g. (0.1 mol) of a 50% solution of 4-methyl-phenylacetaldehyde are dissolved in 100 ml. of ethanol, and 9.9 g. (0.1 mol) of cyclohexylamine are slowly added. After 5 hours, the reaction mixture is cooled to about +5° C., and 17 g. (=59.4% of the theoretical) of 2-(4'-methylphenyl)-6-chloro-quinoxaline-di-N-oxide are obtained as a yellow compound which, after recrystallisation from ethanol, melts at 204 to 207° C.

*Analysis.*—$C_{15}H_{11}N_2O_2Cl$ (mol. wt. 286.5). Calculated (percent): C, 62.90; H, 3.84; N, 9.79. Found (percent): C, 63.30; H, 4.09; N, 9.97.

EXAMPLE 109

18.0 g. (0.1 mol) of 5-ethoxy-benzofurazane-N-oxide and 5.8 g. (0.1 mol) of propionaldehyde are dissolved in 100 ml. of ethanol, and 9.9 g. (0.1 mol) of cyclohexylamine are added slowly. After 5 hours, the reaction mixture is cooled to about +5° C. and 11.0 g. (=50% of the theoretical) of 2-methyl-6-ethoxy-quinoxaline-di-N-oxide are obtained in the form of yellow crystals which, after recrystallisation from ethanol, melt at 215 to 218° C.

*Analysis.*—$C_{11}H_{12}N_2O_3$ (mol. wt. 220). Calculated (percent): C, 60.00; H, 5.46; N, 12.74. Found (percent): C, 59.80; H, 5.55; N, 12.74.

EXAMPLE 110

18.0 g. (0.1 mol) of 5-ethoxy-benzofurazane-N-oxide and 7.2 g. (0.1 mol) of n-butyraldehyde are dissolved in 100 ml. ethanol, and 9.9 g. (0.1 mol) of cyclohexylamine are slowly added. The reaction mixture is then stirred for another 5 hours at 50° C., and is then cooled to about +5° C. and filtered. 14 g. (=59.8% of the theoretical) of 2 - ethyl-6-ethoxy-quinoxaline-di-N-oxide are obtained as yellow crystals which, after recrystallisation from ethanol, melt at 196 to 198° C.

*Analysis.*—$C_{12}H_{14}N_2O_3$ (mol. wt. 234). Calculated (percent): C, 61.4; H, 5.98; N, 11.95. Found (percent): C, 60.86; H, 6.11; N, 11.86.

EXAMPLE 111

18.0 g. (0.1 mol) of 5-ethoxy-benzofurazane-N-oxide and 11.4 g. of oenanthaldehyde are dissolved in 100 ml. ethanol, and 9.9 g. (0.1 mol) of cyclohexylamine are slowly added. The reaction mixture is then stirred for 5 hours at 50° C. and cooled to +5° C. and filtered. 10 g. (=36.2% of the theoretical) of 2 - n-pentyl-6-ethoxy-quinoxaline-di-N-oxide are obtained as yellow crystals which, after recrystallisation from ethanol melt at 118 to 121° C.

*Analysis.*—$C_{15}H_{20}N_2O_3$ (mol. wt. 276). Calculated (percent): C, 65.25; H, 7.24; N, 10.14. Found (percent): C, 65.30; H, 7.38; N, 10.05.

EXAMPLE 112

18.0 g. (0.1 mol) of 5-ethoxy-benzofurazane-N-oxide and 26.8 g. (0.1 mol) of a 50% solution of 4-methyl-phenyl-acetaldehyde in dimethylphthalate are dissolved in 100 ml. of ethanol, and 9.9 g. (0.1 mol) of cyclohexylamine are slowly added. After 5 hours, the reaction mixture is cooled to about +5° C. and filtered. 17.0 g. (=57.5% of the theoretical) of 2-(4'-methylphenyl)-6-ethoxy-quinoxaline-di-N-oxide are obtained as yellow crystals which, after recrystallisation from ethanol, melt at 208 to 212° C.

*Analysis.*—$C_{17}H_{16}N_2O_3$ (mol. wt. 296). Calculated (percent): C, 68.99; H, 5.4; N, 9.46. Found (percent): C, 69.50; H, 5.10; N, 9.44.

EXAMPLE 113

19.5 g. (0.1 mol) of 5-carbomethoxy-benzofurazane-N-oxide and 26.8 g. (0.1 mol) of a 50% solution of 4-methyl-phenyl-acetaldehyde in dimethylphthalate are dissolved in 100 ml. ethanol, and 9.9 g. (0.1 mol) of cyclohexylamine are slowly added. After 5 hours, the reaction mixture is cooled to +5° C. and 12 g. (=38.7% of the theoretical) of 2-(4'-methyl-phenyl) - 6 - carbomethoxy-quinoxaline-di-N-oxide are obtained as yellow crystals which, after recrystallisation from ethanol, melt at 169 to 172° C.

*Analysis.*—$C_{17}H_{14}N_2O_4$ (mol. wt. 310). Calculated (percent): C, 65.75; H, 4.51; N, 9.03. Found (percent): C, 65.95; H, 4.47; N, 8.99.

EXAMPLE 114

21.5 g. (0.1 mol) of 5-sulphonamido-benzofurazane-N-oxide and 26.8 g. (0.1 mol) of a 50% solution of 4-methyl-phenyl-acetaldehyde in dimethylphthalate are dissolved in 100 ml. ethanol, and 9.9 g. (0.1 mol) of cyclohexylamine are slowly added. After 5 hours, the reaction mixture is cooled to about +5° C., and 17.0 g. (=51.4% of the theoretical) of 2-(4'-methylphenyl)-6-sulphonamido-quinoxaline-di-N-oxide are obtained as yellow crystals which, after recrystallisation from dimethyl formamide/ethanol, melt at 236 to 237° C.

*Analysis.*—$C_{15}H_{13}N_3O_4S$. Calculated (percent): C, 54.4; H, 3.93; N, 12.69. Found (percent): C, 54.17; H, 4.11; N, 12.35.

EXAMPLE 115

17.0 g. (0.1 mol) of 5-chloro-benzofurazane-N-oxide and 8.7 g. (0.1 mol) of aldol are dissolved in 100 ml. ethanol, and 9.9 g. (0.1 mol) of cyclohexylamine are slowly added. The reaction mixture is cooled after 5 hours, and 7 g. (29.1% of the theoretical) of 2-(1'-hydroxyethyl)-6-chloro-quinoxaline-di-N-oxide are obtained as yellow crystals which, after recrystallisation from dioxane, melt at 191 to 196° C.

*Analysis.*—$C_{10}H_9ClN_2O_3$ (mol. wt. 240.5). Calculated (percent): C, 49.99; H, 3.75; N, 14.7; O, 11.6. Found (percent): C, 50.30; H, 4.11; N, 14.20; O, 11.2.

EXAMPLE 116

20.5 g. (0.1 mol) of 4,6-dichloro-benzofurazane-N-oxide and 5.8 g. (0.1 mol) of propionaldehyde are dissolved in 100 ml. of ethanol. 9.9 g. (0.1 mol) of cyclohexylamine are added to this solution, and the reaction mixture is boiled for 10 hours. It is then cooled to about +5° C. and 13 g. (=57.2% of the theoretical) of 2-methyl-5,7-dichloro-quinoxaline-di-N-oxide are obtained as red crystals which, after recrystallisation from ethanol/dioxane, melt at 176 to 179° C.

*Analysis.*—$C_9H_6Cl_2N_2O_2$ (mol. wt. 245). Calculated (percent): C, 44.1; H, 2.45; N, 11.45. Found (percent): C, 44.3; H, 2.80; N, 11.98.

EXAMPLE 117

Ammonia is passed for 4 hours at 40 to 50° C. into a solution of 133 g. (1 mol) of the ethylamide of acetoacetic acid and 136 g. (1 mol) of benzofurazane-N-oxide in 250 cc. of methanol, and the reaction mixture is then left to stand for several hours. 182 g. (=70% of the theoretical) of 2-methyl-quinoxaline-1,4-di-N-oxide-3-carboxylic acid ethylamide separate as yellow crystals which, after recrystallisation from methanol, melt at 208 to 209° C.

*Analysis.*—$C_{12}H_{13}N_3O_3$ (mol. wt. 261). Calculated (percent): C, 58.40; H, 5.27; N, 17.0. Found (percent): C, 58.48; H, 5.54; N, 17.1.

EXAMPLE 118

In an analogous manner there are obtained:

(a) From benzofurazane-N-oxide, oxalacetic acid diethyl ester and ammonia: quinoxaline-1,4-di-N-oxide-2,3-dicarbonamide; M.P. 217° C. (decomposition); yield: 81% of the theoretical.

(b) From 5-methoxybenzofurazane-N-oxide, oxalacetic acid diethyl ester an ammonia: 7-methoxy-quinoxaline-1,4-di-N-oxide-2,3-dicarbonamide; M.P. 222° C. (decomposition); yield: 73% of the theoretical.

(c) From 5-ethoxy-benzofurazane-N-oxide, oxalacetic acid diethyl ester and ammonia: 7-ethoxy-quinoxaline-1,4-di-N-oxide-2,3-dicarbonamide; M.P. 218° C. (decomposition); yield: 54% of the theoretical.

(d) From 5-chlor-benzofurazane-N-oxide, oxalacetic acid diethyl ester and ammonia: 7-chloro-quinoxaline-1,4-di-N-oxide-2,3-dicarbonamide; M.P. 300° (decomposition); yield: 69% of the theoretical.

(e) From 5-methyl-benzofurazane-N-oxide, 2-oximino-pentanone-3 and ammonia: 2,7-dimethyl-3-(1'-oximinoethyl)-quinoxaline-di-N-oxide(1,4); M.P. 234° (decomposition); yield: 51% of the theoretical.

(f) From 5-methoxy-benzofurazane-N-oxide, 2-oximino-pentanone-3 and ammonia: 2-methyl-7-methoxy-3-(1'-oximino-ethyl) - quinoxaline-di-N-oxide-(1,4); M.P. 220° C. (decomposition); yield: 55% of the theoretical.

(g) From 5-methyl-benzofurazane-N-oxide, aceto-acetic acid phenyl ester and ammonia: 2,7-dimethyl-quinoxaline-1,4-di-N-oxide-3-carbonamide; M.P. 223° C. (decomposition); yield: 56% of the theoretical.

(h) From 5 - methoxy-benzofurazane-N-oxide, acetoacetic acid phenyl ester and ammonia: 2-methyl-7-methoxy-quinoxaline-1,4-di-N-oxide - 3 - carbonamide; M.P. 245° C. (decomposition); yield: 56% of the theoretical.

(i) From 5-ethoxy-benzofurazane-N-oxide, aceto-acetic acid phenyl ester and ammonia: 2-methyl-7-ethoxy-quinoxaline-1,4-di-N-oxide-3-carbonamide; M.P. 227° C. (decomposition); yield: 31% of the theoretical.

(j) From benzofurazane-N-oxide, aceto-acetic acid-N-piperidide and ammonia: 2-methyl-quinoxaline-1,4-di-N-oxide-3-carbon acid-piperidide; M.P. 178° C.; yield: 60% of the theoretical.

(k) From benzofurazane-N-oxide, aceto-acetic acid-N-pyrrolidide and ammonia: 2-methyl-quinoxaline-1,4-di-N-oxide-3-carboxylic acid N-pyrrolidide; M.P. 185° C.; yield: 63% of the theoretical.

(l) From benzofurazane-N-oxide, cis-decalone-2 and ammonia: 2,3-(2',3'-decahydro-naphtho)-quinoxaline-di-N-oxide; M.P. 196° C.; yield: 47% of the theoretical.

(m) From benzofurazane-N-oxide, methyl-isobutylketone and ammonia: 2-methyl-3-isopropyl-quinoxaline-di-N-oxide-(1,4): M.P. 184° C.; yield: 73% of the theoretical.

(n) From 5-chloro-benzofurazane - N - oxide, methyl-isobutylketone and ammonia: 2-methyl - 3 - isopropyl-7-chloro-quinoxaline-di-N-oxide-(1,4); M.P. 158° C.; yield: 75% of the theoretical.

(o) From 5-methyl-benzofurazane-N-oxide, methyl-isobutylketone and ammonia: 2.7-dimethyl-3-isopropyl-quinoxaline-di-N-oxide-(1,4); M.P. 148° C.; yield: 69% of the theoretical.

(p) From 5-methoxy-benzofurazane-N-oxide, methyl-isobutylketone and ammonia: 2-methyl-3-isopropyl-7-methoxy-quinoxaline-di-N-oxide-(1,4); M.P. 212° C.; yield: 60% of the theoretical.

(q) From 5-ethoxy-benzofurazane-N-oxide, methyl-isobutylketone and ammonia: 2-methyl-3-isopropyl-7-ethoxy-quinoxaline-di-N-oxide-(1,4); M.P. 174° C.; yield: 65% of the theoretical.

(r) From 5-ethoxy-benzofurazane-N-oxide, 2-oximino-petanone-3 and ammonia: 2-methyl - 7 - ethoxy-3-(1'-oximino-ethyl)-quinoxaline-di-N-oxide-(1,4); M.P. 222° C. (decomposition); yield: 52% of the theoretical.

(s) From benzofurazane-N-oxide - 5 - carbonamide, 2-oximino-pentanone-3 and ammonia: 2-methyl-7-carbonamido-3-(1'-oximino-ethyl)-quinoxaline - di - N - oxide-(1,4); M.P. 231° C. (decomposition); yield: 55% of the theoretical.

(t) From 5-chloro-benzofurazane-N-oxide, aceto-acetic acid phenylester and ammonia: 2-methyl-7-chloro-quinoxaline-1,4-di-N-oxide-3-carbonamide; M.P. 232° C. (decomposition); yield: 40% of the theoretical.

As used herein, as the case may be, various generic and specific terms contemplate the following:

Aliphatic—having 1–20 or 1–18 or 1–12 or 1–4 carbon atoms with straight or branched chains and optionally with 1–2 double or triple bond unsaturation, such as $C_{1-20}$ or $C_{1-18}$ alkyl, $C_{2-20}$ alkenyl and $C_{2-20}$ alkynyl, and especially $C_{1-12}$ alkyl, lower alkyl, lower alkenyl and lower alkynyl, and with regard to certain new compounds herein at least 4, or at least 5, or at least 6, or at least 7, or at least 8, or at least 9, or at least 10, or more and up to 20 carbon atoms when alkyl is concerned, e.g. methyl, ethyl, n- and isopropyl, n-, i-, s- and t- butyl, amyl, hexyl, heptyl, octyl, nonyl, decyl, un-, do-, tri-, tetra-, penta-, hexa-, hepta-, octa, nona- -decyl, eicosyl, vinyl, allyl, propenyl, butenyl, pentenyl, hexenyl, heptenyl, octenyl, nonenyl, decenyl, un-, to nona- -decenyl, eicosyleneyl, acetylenyl, propynyl, butynyl, pentynyl, hexynyl, heptynyl, octynyl, nonynyl, decynyl, un- to nona- -decynyl, and the like;

Cycloaliphatic—having 3–17 carbon atoms with mono- to fused tetra-nuclear structure, such as $C_{3-17}$ mono- to fused tetra-nuclear cycloalkyl or cycloalkylene (i.e. cyclopolymethylene), optionally with 1–2 double or triple bond unsaturation, and especially nono- and fused di-nuclear $C_{5-12}$ or mono-nuclear $C_{5-8}$ or mono- and fused di-nuclear $C_{10}$ or mono-nuclear $C_{12}$ of fused tetranuclear $C_{17}$ cycloalkyl, such as cyclo- propyl, butyl, pentyl, hexyl, heptyl, octyl, nonyl, decyl, undecyl, dodecyl; decalin (i.e. decalone), and with regard to certain new compounds herein, camphane (i.e. camphor), cholane (i.e. steroid ketones such as dihydrotestosterone, progesterone, corticosterone, etc.), and the like;

Aromatic—having 6–14 ring carbon atoms with mono- to fused tri-nuclear structure, such as mononuclear $C_6$ aryl, dinuclear $C_{10}$ aryl, trinuclear $C_{14}$ aryl, such as phenyl, naphthyl, anthracenyl, phenanthrenyl, and the like;

Heterocyclic—having 5–6 ring members including 1–3 hetero linking atoms such as N, O, S or mixtures of such hetero atoms, and especially 1 or 2 or 3 N atoms or 1 N atom and 1 O or S atom, with mono- and fused di-nuclear structure, such as pyrrolidino, piperidino, piperazino, pyridyl, pyrimidino, indolyl, benzotriazolyl, morpholino, thiazolyl, benzothiazolyl, and the like;

Halo—chloro, bromo, fluoro and iodo, especially chloro and/or bromo;

Perhalo lower alkyl—di, tri, tetra, poly and mixed chloro, bromo, fluoro, and iodo substituted lower alkyl such as trichloromethyl, trifluoromethyl, etc., and the like;

lower alkyl—especially $C_{1-4}$ alkyl;
lower alkoxy—especially $C_{1-4}$ alkoxy;
carbo lower alkoxy—the radical —COO-(lower alkyl);
carboaryloxy—the radical —COO-(aryl);
lower alkanoyl—the radical —CO-(lower alkyl);
carbamido—the radical —CO—NH$_2$;

N-substituted carbamido—e.g. the radicals —CONH-($C_{1-12}$ alkyl), —CON-($C_{1-12}$ dialkyl), —CONH-($C_{5-8}$ cycloalkyl), —CONH-($C_{6-10}$ aryl), —CONH-(heterocyclic), and the like;

Sulfonamido—the radical —SO$_2$—NH$_2$;
N-substituted sulfonamido—e.g. the radicals
—SO$_2$—NH-(lower alkyl)
—SO$_2$—NH-(2-pyrimidino), and the like;

N-substituted amino—e.g. the radicals $C_{1-12}$ or lower alkyl, $C_{5-8}$ cycloalkyl, $C_{6-10}$ aryl, substituted aryl which is substituted with lower alkyl, lower alkoxy, halo, sulfonamido, N-substituted sulfonamido and/or azobenzeneamino, and the like;

With the proviso that various substituents as taught in accordance with the present invention may be present on certain of the foregoing radicals, as the case may be, e.g. oximino, hydroxy, cyano, $C_{6-10}$ aryl and especially phenyl, substituted $C_{6-10}$ aryl and especially substituted phenyl, carboxy, lower alkanoyl, $C_{1-12}$ alkyl and especially lower alkyl, lower alkoxy, halo, perhalo lower alkyl, $C_{5-8}$ cycloalkyl and especially cyclohexyl, azobenzene, carbolower alkoxy, carbo $C_{6-10}$ aryloxy and especially carbophenoxy, carbamido, N-substituted carbamido, sulfonamido, N-substituted sulfonamido, amino, N-substituted amino, heterocyclic, N-substituted heterocyclic, and the like.

In the same way, the ketones include, inter alia:

Dialiphatic ketones—symmetrical and asymmetrical, straight and branched, dialiphatic having 1–20 or 1–18 or 1–12 or 1–4 carbon atoms in each aliphatic moiety, and preferably a total of 3–20 carbon atoms, optionally with 1–2 double or triple bond unsaturation, and the like;

Cycloaliphatic ketones—having 3–17 ring carbon atoms with mono- to fused tetra-nuclear structure, such as $C_{3-17}$ mono- to fused tetra-nuclear cycloalkyl or cycloalkylene (i.e. cyclopolymethylene), optionally with 1–2 double or triple bond unsaturation, and especially mono- and fused di-nuclear $C_{5-12}$ or mono-nuclear $C_{5-8}$ or mono- and fused di-nuclear $C_{10}$ or mono-nuclear $C_{12}$ or fused tetra-nuclear $C_{17}$-cycloalkyl, and the like; and Aliphatic aromatic ketones—in which the aliphatic moiety is of the type noted above, and the aromatic moiety has 6–14 ring carbon atoms with mono- to fused trinuclear structure, such as mono-nuclear $C_6$ aryl, di-nuclear $C_{10}$ aryl, tri-nuclear $C_{14}$ aryl, and the like;

Heterocyclic ketones—having 5–6 ring members including 1–3 hetero linking atoms such as N, O, S or mixtures of such hetero atoms, and especially 1 or 2 or 3 N atoms or 1 N atom and 1 O or S atom, with mono- and fused di-nuclear structure, and the like;

Aliphatic-amino ketones—i.e. aliphatic carbamides: in which the aliphatic moiety is of the type noted above, and the carbamide moiety is unsubstituted carbamido or N-substituted carbamido of the type noted above;

Aliphatic-heterocyclic ketones—i.e. aliphatic-heterocyclic amides or alkanoyl heterocyclic: in which the aliphatic moiety or alkanoyl moiety is of the type noted above, and the heterocyclic moiety is of the type noted above;

Whereas the adlehydes include, inter alia:

Aliphatic aldehydes—straight and branched, having 2–20 or 2–16 or 2–4 carbon atoms, optionally with 1–2 double or triple bond unsaturation, and the like;

Cycloaliphatic aldehydes—having 3–12 or 5–8 or 10 or 12 ring carbon atoms with mono- to fused di-nuclear structure in the cycloaliphatic moiety, such as $C_{3-12}$ cycloalkyl or cycloalkylene (i.e. cyclopolymethylene), optionally with 1–2 double or triple bond unsaturation, and the like;

Aromatic aldehydes—having 6–14 ring carbon atoms with mono- to fused tri-nuclear structure in the aromatic moiety, such as mono-nuclear $C_6$ aryl, di-nuclear $C_{10}$ aryl, tri-nuclear $C_{14}$ aryl, and the like; and Heterocyclic aldehydes—having 5–6 ring members including 1–3 hetero linking atoms such as N, O, S or mixtures of such hetero atoms, and especially 1 or 2 or 3 N atoms or 1 N atom and 1 O or S atom, with mono- and fused di-nuclear structure, and the like;

With the proviso that various substituents as taught in accordance with the present invention may be present on certain of the foregoing radicals, to wit:

Dialiphatic ketone substituents—oximino; hydroxy; cyano; $C_{6-10}$ aryl; N-substituted $C_{6-10}$ aryl; $C_{1-4}$ aliphatic acyl, especially $C_{1-4}$ alkanoyl, carboxy, carbolower alkoxy, carbo $C_{5-8}$ cycloalkoxy, carbo $C_{6-10}$ aryloxy, carbamido, N-substituted carbamido, and the like; N-substituted amino, especially mono and di lower alkyl amino, mono and di $C_{5-8}$ cycloalkyl amino, N-lower alkyl-N-$C_{5-8}$ cycloalkyl amino, N-containing heterocyclic having 5–6 ring members including 1–3 hetero linking atoms of the foregoing types, e.g. where two corresponding alkyl groups together form at least part of such heterocyclic moiety with the amino N-atom, N-substituted heterocyclic, and the like;

Cycloaliphatic ketone substituents—$C_{1-4}$ alkyl; hydroxy; oximino; and the like;

Aliphatic-aromatic ketone substituents—on the aliphatic moiety: same as the di-aliphatic ketone substituents and also cyano, and the like; on the aromatic moiety: $C_{6-10}$ aryl, especially phenyl, lower alkyl, lower alkoxy, halo, and the like;

Heterocyclic ketone substituents—lower alkyl; phenyl; and the like;

Aliphatic-amino ketone substituents—on the aliphatic moiety: same as the dialiphatic ketone substituents; on the amino moiety: same as the substituents for the N-substituted carbamido as noted above, and in the case of N—$C_{6-10}$ aryl amino, the aryl group including 1–3 lower alkyl, lower alkoxy, halo, sulfonamido, N-substituted sulfonamido and/or azobenzene substituents;

Aliphatic - heterocyclic ketone substituents—on the aliphatic moiety: same as the dialiphatic ketone substituents; on the heterocyclic moiety: lower alkyl, $C_{6-10}$ aryl, especially phenyl, and the like;

Aliphatic and cycloaliphatic aldehyde substituents—hydroxy, $C_{6-10}$ aryl, especially phenyl, and substituted $C_{6-10}$ aryl in which the aryl substituents include lower alkyl, lower alkoxy and halo, and the like;

Aromatic aldehyde substituents—lower alkyl, lower alkoxy, halo, perhalo lower alkyl, especialy di, tri and mixed halo $C_{1-2}$ alkyl, and the like; and Heterocyclic aldehyde substituents—same as the heterocyclic ketone substituents.

In particular, in connection with the foregoing, the following substituents are preferred for the starting ketones and aldehydes and for $R_1$ and $R_2$:

Aliphatic substituents—oximino, cyano, hydroxy, lower alkanoyl, carboxy, carbolower alkoxy, carbo $C_{6-10}$ aryloxy especially carbophenoxy, carbamido, N—$C_{1-12}$ alkyl carbamido, N-cycloalkyl carbamido, N—$C_{6-10}$ aryl carbamido, N-substituted $C_{6-10}$ aryl carbamido in which the aryl moiety is substituted with 1–3 lower alkyl, lower alkoxy, halo, especially chloro, sulfonamido, azobenzene, and mixtures thereof, N-heterocyclic carbamido, N-lower alkyl- and N-phenyl-heterocyclic carbamido, heterocyclic, heterocyclic carbonyl, $C_{6-10}$ aryl, lower alkyl $C_{6-10}$ aryl;

Cycloaliphatic substituents—oximino, lower alkyl;

Whereas the following substituents are preferred for the starting N-oxides and for R:

Lower alkyl, lower alkoxy, halo, especially chloro and bromo, sulfonamido, N-heterocyclic sulfonamido, especially N-2-pyridinyl sulfonamido, carbo lower alkoxy, carbamido, N—$C_{6-10}$ aryl carbamido, especially N-phenylcarbamido, and N-halo $C_{6-10}$ aryl carbamido, especially N-chloro phenyl carbamido.

Thus, the present invention broadly contemplates a process for the versatile and simple production of a very broad variety of quinoxaline-di-N-oxides having the formula

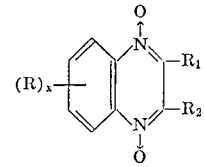

in which
$x$ is a number from 1–2;

Each individual R is selected from the group consisting of hydrogen; halo; alkyl having 1–16 carbon atoms; lower alkoxy; carbolower alkoxy; carboaryloxy having 6–10 ring carbon atoms in the aryl moiety; carbamido; N-arylcarbamido having 6–10 ring carbon atoms in the aryl moiety; N-substituted aryl carbamido having 6–10 ring carbon atoms in the aryl moiety in which the corresponding aryl moiety is substituted, with 1–3 substituents selected from the group consisting of lower alkyl, lower alkoxy, halo, and mixtures of such substituents; N-heterocyclic carbamido having 5–6 ring members including 1–3 hetero linking atoms selected from the group consisting of N, O, S, and mixtures of such hetero atoms; and sulfonamido having the formula

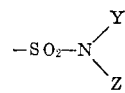

in which Y is selected from the group consisting of hydrogen and lower alkyl, and Z is selected from the group consisting of hydrogen, lower alkyl, cycloalkyl having 5–8 ring carbon atoms, aryl having 6–10 ring carbon atoms, substituted aryl having 6–10 ring carbon atoms which is substituted with 1–3 substituents selected from the group consisting of lower alkyl, lower alkoxy, halo, and mixtures of such substituents, and heterocyclic having 5–6 ring members including 1–3 hetero linking atoms selected from the group consisting of N, O, S, and mixtures of such hetero atoms; with the proviso that when $x$ is 2 the R radicals together may form a fused benzene ring;

$R_1$ and $R_2$ each individually is hydrogen; $C_{1-18}$ aliphatic; substituted $C_{1-18}$ alkyl which is substituted with oximino, hydroxy, cyano, lower alkanoyl, $C_{6-10}$ aryl, substituted $C_{6-10}$ aryl which is substituted with 1–2 substituents such as lower alkyl, lower alkoxy, and/or halo, carbamido, N-lower alkyl carbamido, N—$C_{6-10}$ aryl carbamido, N-substituted $C_{6-10}$ aryl carbamido in which the corresponding aryl moiety is substituted with 1–3 substituents such as lower alkyl, lower alkoxy, and/or halo, monolower alkylamino, dilower alkylamino, N—$C_{5-8}$ cycloalkylamino, N-azobenzene amino, heterocyclic having 5–9 ring members including 1–3 hetero linking atoms such as N, O, and/or S, lower alkyl substituted N-heterocyclic having 5–6 ring members including 1–3 hetero linking atoms such as N, O, and/or S, N-heterocyclic-amino having 5–6 ring members including 1–3 hetero linking atoms such as N, O, and/or S, N-sulfonamido-$C_{6-10}$ arylamino, or mixtures of such substituents; $C_{6-14}$ aryl; substituted $C_{6-14}$ aryl which is substituted with 1–3 substituents such as lower alkyl, lower alkoxy, halo, perhalo lower alkyl, and/or phenyl; carbolower alkoxy; carbamido; N—$C_{1-12}$ alkyl carbamido; N—$C_{5-8}$ cycloalkyl carbamido; N—$C_{6-10}$ arylcarbamido; N-substituted $C_{6-10}$ aryl carbamido in which the corresponding aryl moiety is substituted with 1–3 substituents such as $C_{1-12}$ alkyl, lower alkoxy, halo, azobenzene, and/or sulfonamido; heterocyclic having 5–6 ring members including 1–3 hetero linking atoms such as N, O, and/or S; heterocyclic carbonyl having 5–6 ring members including 1–3 hetero linking atoms such as N, O, and/or S; N,N' - heterocyclic - bis - carbonyl having 5–6 ring members and two N linking atoms; N-heterocyclic carbamido having 5–6 ring members including 1–3 hetero linking atoms such as N, O, and/or S; N-substituted heterocyclic carbamido having 5–6 ring members including 1–3 hetero linking atoms such as N, O, and/or S, in which the corresponding heterocyclic moiety is substituted with lower alkyl, and/or aryl having 6–10 ring carbon atoms; or lower alkanoyl;

With the proviso that $R_1$ and $R_2$ when taken together may form a fused ring system such as a fused cycloalkylene ring system having 1–15 ring carbon atoms in addition to the two adjacent carbon atoms of the quinoxaline ring, a fused heterocyclic ring system having 3–7 ring members including 1–3 hetero linking atoms such as N, O, and/or S in addition to the two adjacent carbon atoms of the quinoxaline ring, such fused cycloalkylene ring system which is substituted with oximino, lower alkyl, and/or hydroxy, or such fused heterocyclic system which is lower alkyl substituted;

Which comprises reacting in an organic diluent at a temperature substantially between about 20–100° C. benzofurazane-N-oxide having the formula

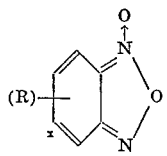

in which R and $x$ are the same as defined above, with a reagent selected from the group consisting of (a) At least an equivalent quantity of both an organic carbonyl compound, having a ring carbon contributing member such as methylene or methyl adjacent the corresponding carbonyl group of such carbonyl compound and precursor radicals adjacent both said carbonyl group and said ring carbon contributing member corresponding to said $R_1$ and $R_2$ radicals, respectively, and a nitrogen compound such as primary aliphatic amine or ammonia, and (b) At least an equivalent quantity of the corresponding Schiff's base to the reagent under (a).

Furthermore, the carbonyl compound may have the formula

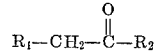

in which $R_1$ and $R_2$ are the same as defined above,

With the proviso that when the reaction is carried out in the presence of ammonia and any such $R_1$ and $R_2$ in the quinoxaline—di-N-oxide is to be carbamido, or substituted $C_{1-18}$ alkyl which is substituted with carbamido, the corresponding carbamido substituent in the starting carbonyl compound may be replaced by a substituent such as carbo lower alkoxy or carbo-$C_{5-10}$ aryloxy, and With the further proviso that when the reaction is carried out in the presence of ammonia and any such $R_1$ and $R_2$ in the quinoxaline—di-N-oxide is to be $C_{1-18}$ aliphatic, a corresponding hydrogen atom thereof in the starting carbonyl compound may be replaced by a carboxylic acid group.

In particular, the carbonyl compound may be an oxo or keto compound such as $C_{3-20}$ dialiphatic ketone; substituted $C_{3-20}$ dialkyl ketone which is substituted with a substituent such as oximino, hydroxy, cyano, lower alkanoyl, $C_{6-10}$ aryl, substituted $C_{6-10}$ aryl which is substituted with 1–2 substituents such as lower alkyl, lower alkoxy, and/or halo, carbamido, N-lower alkyl carbamido, N—$C_{6-10}$ aryl carbamido, N-substituted $C_{6-10}$ aryl carbamido in which the corresponding aryl moiety is substituted with 1–3 substituents such as lower alkyl, lower alkoxy, and/or halo, mono-lower alkylamino, dilower alkylamino, N—$C_{5-8}$ cycloalkylamino, N-azobenzene amino, heterocyclic having 5–6 ring members including 1–3 hetero linking atoms such as N, O, and/or S, lower alkyl substituted N-heterocyclic having 5–6 ring members including 1–3 hetero linking atoms such as N, O, and/or S, N-heterocyclic amino having 5–6 ring members including 1–3 hetero linking atoms such as N, O, and/or S, N-sulfonamido-$C_{6-10}$ arylamino, or mixtures of such substituents; lower alkyl-$C_{6-14}$ aryl ketone; lower alkyl-substituted $C_{6-14}$ aryl ketone in which the aryl moiety is substituted with 1–3 substituents such as alkyl, lower alkoxy, halo, perhalo lower alkyl, and/or phenyl; α- or β- keto lower alkanoic acid lower alkyl ester; α- or β- keto lower alkanoyl amide; N—$C_{1-12}$ alkyl-α- or β- keto lower alkanoyl amide; N—$C_{5-8}$ cycloalkyl-α- or β- keto lower alkanoyl amide; N—$C_{6-10}$ aryl-α- or β- keto lower alkanoyl amide; N-substituted $C_{6-10}$ aryl-α- or β- keto lower alkanoyl amide in which the corresponding aryl moiety is substituted with 1–3 substituents such as $C_{1-12}$ alkyl, lower alkoxy, halo, azobenzene, and/or sulfonamido; α- or β- keto lower alkyl heterocyclic having 5–6 ring members including 1–3 hetero linking atoms such as N, O, and/or S; α- or β- keto lower alkanoyl heterocyclic having 5–6 ring members including 1–3 hetero linking atoms such as N, O, and/or S; N,N'-bis(α- or β- keto lower alkanoyl) heterocyclic having 5–6 ring members including two N linking atoms; N-heterocyclic α- or β- keto lower alkanoylamide having 5–6 ring members including 1–3 hetero linking atoms such as N, O, and/or S; N-sunbstituted heterocyclic α- or β- keto lower alkanoyl amide having 5–6 ring members including 1–3 hetero linking atoms such as N, O, and/or S in which the heterocyclic moiety is substituted with a substituent such as lower alkyl, and/or $C_{6-10}$ aryl; cycloalkyl ketone having 3–17 ring carbon atoms; heterocyclic ketone having 5–6 ring members including 1–3 hetero linking atoms such as N, O, and/or S; substituted cycloalkyl ketone having 3–17 ring carbon atoms which is substituted with a substituent such as oximino, lower alkyl, and/or hydroxy; or lower alkyl substituted heterocyclic ketone having 5–6 ring members including 1-2 hetero linking atoms such as N, O, and/or S;

With the proviso that when the reaction is carried out in the presence of ammonia, such carbonyl compound additionally includes ω-keto substituted $C_{2-20}$ dialiphatic ketone in which the ω-keto group is substituted with a terminal substituent such as hydroxy, lower alkoxy or $C_{6-10}$ aryloxy; or α- or β- keto lower alkanoic acid ester in which the ester group is lower alkyl or $C_{6-10}$ aryl.

Also, the carbonyl compound may be an aldehyde having the formula

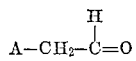

in which A is hydrogen; $C_{1-18}$ aliphatic; substituted $C_{1-18}$ aliphatic which is substituted with 1-2 substituents such as hydroxy, $C_{6-10}$ aryl, and/or substituted $C_{6-10}$ aryl which is substituted with 1-2 substituents such as lower alkyl, lower alkoxy, and/or halo; $C_{6-14}$ aryl; substituted $C_{6-14}$ aryl which is substituted with 1-3 substituents such as lower alkyl, lower alkoxy, halo, and/or perhalo lower alkyl; $C_{3-12}$ cycloalkyl; or heterocyclic having 5-6 ring members including 1-3 hetero linking atoms such as N, O, and/or S.

Preferably, the carbonyl compound is $C_{3-20}$ dialkyl ketone; substituted $C_{3-20}$ dialkyl ketone which is substituted with 1-2 substituents such as oximino, cyano, phenyl, lower alkanoyl, carboxylic acid, carbolower alkoxy, carbophenoxy, carbonamido, N-lower alkyl carbonamido, N-cyclohexyl carbamido, N-phenyl carbamido, N-substituted phenyl carbamido in which such phenyl is substituted with a substituent such as lower alkyl, lower alkoxy, chloro, sulfonamido, and/or azobenzene, N-morpholino carbamido, N-pyridinyl carbamido, N-lower alkyl pyrimidinyl carbamido, N-benzothiazolyl carbamido, N-thiazolyl carbamido, N-phenyl benzo tri-azolyl carbamido, pyrrolidino carbonyl, piperidino carbonyl, N,N'-piperazine bis-carbonyl, morpholino, or mixtures of such substituents; $C_{6-12}$ cycloalkanone; oximino $C_{6-12}$ cycloalkanone; $C_{10}$ bicycloalkanone; cholane compound having at least 1 ring keto group and 17 ring carbon atoms; lower alkylphenyl ketone; $C_{2-7}$ aliphatic aldehyde which may be substituted with a substituent such as hydroxy, phenyl or lower alkyl phenyl; and Wherein the corresponding Schiff's base is based upon such carbonyl compound member and a primary aliphatic amine such as cyclohexylamine or lower alkylamine; and Wherein when $x$ is 1, R is chloro, bromo, lower alkyl, lower alkoxy, sulfonamido, N-lower alkylphenyl sulfonamido, N-pyridinyl sulfonamido, carbolower alkoxy, N-phenylamino carbonyl, N-chlorophenylamino carbonyl, or carbamido, whereas when $x$ is 2, R is chloro, bromo, and/or lower alkyl.

As to the new quinoxaline-di-N-oxide compounds contemplated herein, these include those in which $x$ and R are the same as defined above, $R_1$ is hydrogen; $C_{1-18}$ aliphatic; substituted $C_{1-18}$ alkyl which is substituted with a substituent such as oximino, hydroxy, cyano, lower alkanoyl, $C_{6-10}$ aryl, substituted $C_{6-10}$ aryl which is substituted with 1-2 substituents such as lower alkyl, lower alkoxy, and/or halo, carbamido, N-lower alkyl carbamido, N-$C_{6-10}$ arylcarbamido, N-substituted $C_{6-10}$ aryl carbamido in which the corresponding aryl moiety is substituted with 1-3 substituents such as lower alkyl, lower alkoxy, and/or halo, mono lower alkylamino, dilower alkylamino, N-$C_{5-8}$ cycloalkylamino, N-azobenzene amino, heterocyclic having 5-6 ring members including 1-3 hetero linking atoms such as N, O, and/or S, lower alkyl substituted N-heterocyclic having 5-6 ring members including 1-3 hetero linking atoms such as N, O, and/or S, N-heterocyclic amino having 5-6 ring members including 1-3 hetero linking atoms such as N, O, and/or S, N-sulfonamido $C_{6-10}$ arylamino, or mixtures of such substituents; $C_{6-14}$ aryl; substituted $C_{6-14}$ aryl which is substituted with 1-3 substituents such as lower alkyl, lower alkoxy, halo, perhalo lower alkyl, and/or phenyl; carbolower alkoxy; carbamido; N-$C_{1=12}$ alkyl carbamido; N-$C_{5-8}$ cycloalkyl carbamido; N-$C_{6-10}$ aryl carbamido; N-substituted $C_{6-10}$ aryl carbamido in which the corresponding aryl moiety is substituted with 1-3 substituents such as $C_{1-12}$ alkyl, lower alkoxy, halo, azobenzene, and/or sulfonamido; heterocyclic having 5-6 ring members including 1-3 hetero linking atoms such as N, O, and/or S; heterocyclic carbonyl having 5-6 ring members including 1-3 hetero linking atoms such as N, O, and/or S; N,N'-heterocyclic-bis-carbonyl having 5-6 ring members and two N linking atoms; N-heterocyclic carbamido having 5-6 ring members including 1-3 hetero linking atoms such as N, O, and/or S; N-substituted heterocyclic carbamido having 5-6 ring members including 1-3 hetero linking atoms such as N, O, and/or S in which the correpsonding heterocyclic moiety is substituted with a substituent such as lower alkyl, and/or $C_{6-10}$ aryl; or lower alkanoyl; and $R_2$ is substituted $C_{1-18}$ aliphatic which is substituted with a substituent such as cyano, lower alkyl substituted $C_{6-10}$ aryl, carbamido, N-$C_{6-10}$ arylcarbamido, N-halo substituted $C_{6-10}$ aryl carbamido, or mixtures of such substituents; carbamido; N-$C_{1-12}$ alkyl carbamido; N-$C_{5-8}$ cycloalkyl carbamido; N-$C_{6-10}$ aryl carbamido; N-substituted $C_{6-10}$ aryl carbamido in which the corresponding aryl radical is substituted with 1-3 substituents such as $C_{1-12}$ alkyl, lower alkoxy, halo, azobenzene, and/or sulfonamido; heterocyclic having 5-6 ring members including 1-3 hetero linking atoms such as N, O and/or S; hetero cyclic carbonyl having 5-6 ring members including 1-3 hetero linking atoms such as N, O, and/or S; N,N'-heterocyclic-bis-carbonyl having 5-6 ring members including 1-3 hetero linking atoms such as N, O, and/or S; N-heterocyclic carbamido having 5-6 ring members including 1-3 hetero linking atoms such as N, O, and/or S; N-substituted heterocyclic carbamido having 5-6 ring members including 1-3 hetero linking atoms such as N, O, and/or S in which the corresponding heterocyclic moiety is substituted with a substituent such as lower alkyl, and/or $C_{6-10}$ aryl; or lower alkanoyl;

With the proviso that $R_1$ and $R_2$ when taken together may form a fused cycloalkylene ring system having 1-15 ring carbon atoms in addition to the two adjacent carbon atoms of the quinoxaline ring which is thereby substituted with at least one substituent corresponding to the substituted aliphatic substituents when $R_2$ is substituted aliphatic.

Preferably, in such new compounds $R_2$ is naphthyl, anthracenyl or phenanthrenyl; or a radical of the formula

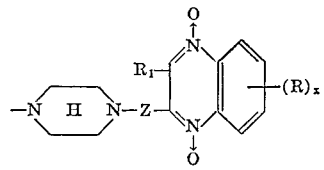

in which $x$, R and $R_1$ are the same as defined above, and Z is selected from the group consisting of

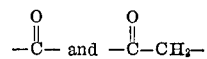

Also, such new compounds may have the formula

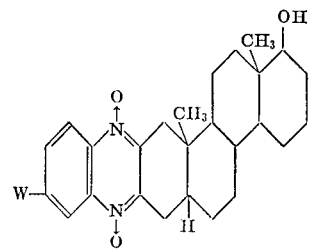

in which W is selected from the group consisting of hydrogen, halo, and lower alkyl.

It will be realized that in accordance with the present invention, all of the foregoing compounds which are producible by way of the instant process possess desirable therapeutic biological and pharmacological properties, including anti-bacterial action, and especially anti-amoebic action [see Jones et al., Brit. J. Pharmacol. (1953), 8, 286–287], and anti-viral action, and especially in treating psittacosis virus and lymphogranuloma virus [see Hurst et al., Brit. J. Pharmacol. (1953), 8, 297–302], as well as antiseptic use for urinary tract and general infections, and especially chronic respiratory conditions in poultry and sinus infections in turkeys, and as anthelmintic agents (see Belgian Pats. 669,353 and 682,444). Such compounds are also usable, of course, as chemical intermediates for analogous quinoxaline - 1,4 - di-N-oxide derivatives useful as plant protective agents, e.g. pesticides.

Their herbicidal activity for instance may be demonstrated by the following:

Post-emergence test
Solvent: 5 parts by weight acetone
Emulsifier: 1 part by weight alkyl-aryl-polyglycolether To produce a suitable preparation of active compound, 1 part by weight of active compound is mixed with the stated amount of solvent, the stated amount of emulsifier is added and the concentrate is then diluted with water to the desired concentration.

Test plants which have a height of about 5–15 cm. are sprayed with the preparation of the active compound until just dew moist. After three weeks, the degree of damage to the plants is determined and characterised by the values 0–5, which have the following meaning:

0 no effect
1 a few slightly burnt spots
2 marked damage to leaves
3 some leaves and parts of stalks partially dead
4 plant partially destroyed
5 plant completely dead.

The active compounds, their concentrations and the results obtained can be seen from the following table:

| Active ingredient | Concentration in percent | a | b | c | d | e | f | Remarks |
|---|---|---|---|---|---|---|---|---|
| 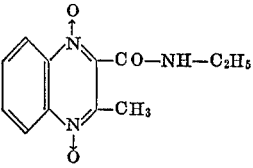 | 0.2 | 5 | 5 | 4 | 5 | 5 | | Total herbicide. |
| 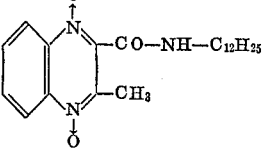 | 0.2 | 1 | 4–5 | 1 | 1 | 0 | | |
| 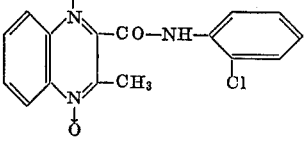 | 0.2 | 1 | 3 | 1 | 1 | 0 | | |
| 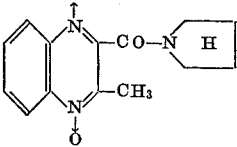 | 0.2 | 4 | 0 | 1 | 1 | 0 | | |
| 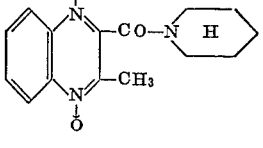 | 0.2 | 2 | 3 | 1 | 2 | 2 | | |
| 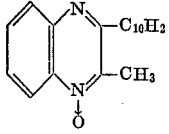 | 0.2 | 1 | 0 | 1 | 3 | 1 | | |

| Active ingredient | Concentration in percent | a | b | c | d | e | f | Remarks |
|---|---|---|---|---|---|---|---|---|
| 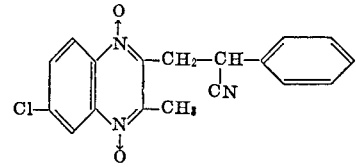 | 0.2 | 0 | 3 | 0 | 3 | 2 | .... | |
| 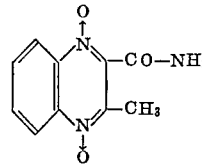 | 0.2 | 3 | 5 | 0 | 5 | 4 | 1 | Selective in cereal. |
| 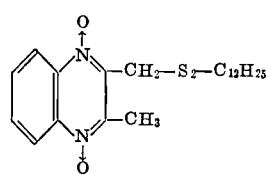 | 0.2 | 0 | 5 | 1 | 5 | .... | 0 | Selective for dicotyle in cereal |
| 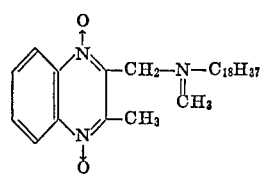 | 0.2 | 5 | 5 | 4 | 5 | .... | 1 | Selective in wheat. |

NOTE:
a = *Echinchloa crus galli.*
b = *Chenopodium album.*
c = *Areua fatua.*
d = *Sinapis arvensis.*
e = *Phaseolus vulgaris.*
f = *Triticum aestivum*

Pre-emergence test
Solvent: 5 parts by weight acetone
Emulsifier: 1 part by weight alkyl-aryl-polyglycolether To produce a suitable preparation of active compound, 1 part by weight of active compound is mixed with the stated amount of solvent, the stated amount of emulsifier is added and the concentrate is then diluted with water to the desired concentration.

Seeds of the test plants are shown in normal soil and, after 24 hours, watered with the preparation of the active compound. It is expedient to keep constant the amount of water per unit area. The concentration of the active compound in the preparation is of no importance, only the amount of active compound applied per unit area being decisive. After three weeks, the degree of damage to the test plants is determined and characterised by the values 0–5, which have the following meaning:

0 no effect
1 slight damage or delay in growth
2 marked damage or inhibition of growth
3 heavy damage and only deficient development or only 50% emerged
4 plants partially destroyed after germination or only 25% emerged
5 plants completely dead or not emerged.

The active compounds, the amounts applied and the results obtained can be seen from the following table:

| Active ingredient | Active compound used in kg. pro hectare | a | b | c | d | f | Remarks |
|---|---|---|---|---|---|---|---|
| 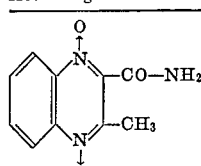 | 40 | 5 | 5 | 5 | 5 | 5 | Total herbicide. |
| 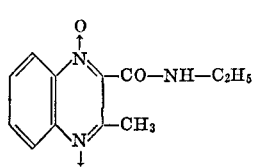 | 40 | 5 | 5 | 5 | 5 | 5 | Total herbicide. |

| Active ingredient | Active compound used in kg. pro hectare | a | b | c | d | f | Remarks |
|---|---|---|---|---|---|---|---|
| 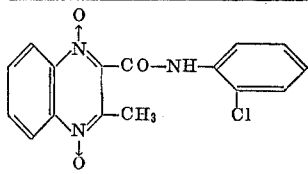 | 40 | 0 | 0 | 0 | 4 | 0 | |
| 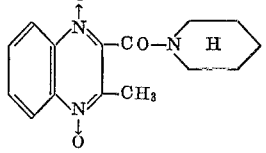 | 40 | 5 | 1 | 0 | 3 | 0 | |
| 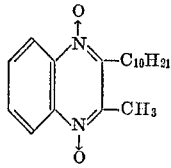 | 40 | 2 | 1 | 0 | 1 | 0 | |
| 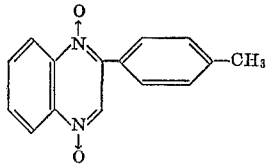 | 40 | 4 | 3 | 5 | 3 | 0 | Selective in wheat. |
| 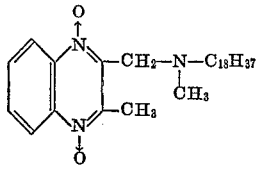 | 40 | 4 | 5 | 2 | 5 | 0 | Selective in wheat. |

The meaning of a, b, c, d and f see declaration given before for the post-emergence test.

Also the other compounds obtainable according to the process of the invention can be used for the same purpose and show similar activity.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. A method for the preparation of quinoxaline-di-N-oxides which comprises reacting a benzofurazane-N-oxide with (a) (1) a carbonyl compound containing a methylene or methyl group adjacent the carbonyl group and (2) a primary amine or ammonia, or (b) a Schiff's base corresponding to the reaction product of (a)(1) and (a)(2).

2. Process according to claim 1 wherein said carbonyl compound is used in sufficient excess to react with the benzofurazane-N-oxide and also to serve as an organic diluent for the reaction.

3. Process according to claim 1 wherein between about 1.0–1.5 mols of carbonyl compound and between about 1.1–3.0 mols of the corresponding nitrogen compound are used per mol of such benzofurazane-N-oxide.

4. Process according to claim 1 wherein between about 1.0–1.5 mols of the corresponding Schiff's base is used per mol of such benzofurazane-N-oxide.

5. Process according to claim 1 wherein the reaction is carried out at a temperature between about 20–100° C.

6. Process according to claim 1 wherein the carbonyl compound which is used per se or as the Schiff's base contains the grouping

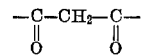

7. Process according to claim 1 wherein the carbonyl compound which is used per se or as the Schiff's base contains the acetoacetyl grouping.

8. Process according to claim 1 wherein the carbonyl compound which is used per se or as the Schiff's base is an acetoacetic acid ester.

9. Process according to claim 1 wherein the carbonyl compound which is used per se or as the Schiff's base is an acetoacetamide.

References Cited

UNITED STATES PATENTS 3,398,141    8/1968    Haddadien et al. ____ 260—239.5

OTHER REFERENCES

Chemical Abstracts, vol. 64, p. 11228 (1966).

NICHOLAS S. RIZZO, Primary Examiner

U.S. Cl. X.R.

260—239.5, 247.2 A, 268 HET, 256.4 N; 424—250

UNITED STATES PATENT OFFICE
CERTIFICATE OF CORRECTION

Patent No. 3,660,398　　　　　　　　　　Dated May 2, 1972

Inventor(s) Kurt Ley et al

It is certified that error appears in the above-identified patent and that said Letters Patent are hereby corrected as shown below:

Col. 6, line 73

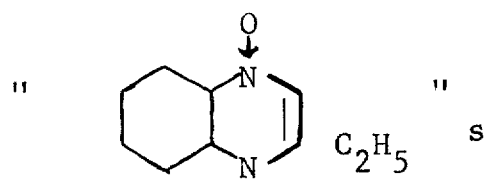 should be -- 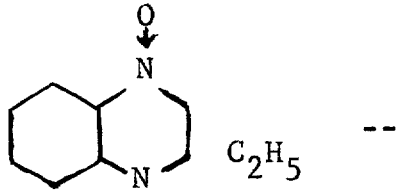 --

Col. 8, line 65

"-3-hexadecyle-7-ethoxy" should be -- 6-ethoxy --.

Col. 9, line 13

"6" should be -- 5 --.

UNITED STATES PATENT OFFICE
CERTIFICATE OF CORRECTION

Patent No. 3,660,398  Dated May 2, 1972

Inventor(s) Kurt Ley et al

It is certified that error appears in the above-identified patent and that said Letters Patent are hereby corrected as shown below:

Col. 9, line 13

" $\underset{\uparrow}{N}$ " should be -- $\underset{\uparrow}{O}$ --.

Col. 9, line 24

"61,21;" should be -- 61.21; --.

Col. 10, line 51

"crystas" should be -- crystals --.

Col. 10, line 58 after "(excess" insert -- ) --.

Col. 12, line 53

"$C_{19}H_{27}S1N_2O_2$" should be -- $C_{19}H_{27}ClN_2O_2$ --.

Col. 12, line 63

"ethenol" should be -- methanol --.

Col. 12, line 64

"depressing" should be -- depression --.

UNITED STATES PATENT OFFICE
CERTIFICATE OF CORRECTION

Patent No. 3,660,398  Dated May 2, 1972

Inventor(s) Kurt Ley et al

It is certified that error appears in the above-identified patent and that said Letters Patent are hereby corrected as shown below:

Col. 18, line 68

"$C_2H_{42}N_2O_2$" should be -- $C_{26}H_{42}N_2O_2$ --.

Col. 18, line 69

"77.50" should be -- 75.50 --.

Col. 22, line 32

"$C_{16}H_{14}N_3SO_5$" should be -- $C_{16}H_{14}N_4SO_5$ --.

Col. 25, line 57

" 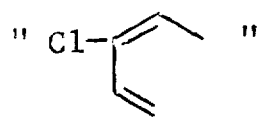 "   should be -- 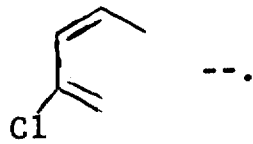 --.

Col. 25, line 72

"2-" should be -- 2' --.

Col. 28, line 23

"$C_{26}N_6O_8 \cdot H_2O$" should be -- $C_{26}H_{26}N_6O_8$ --.

UNITED STATES PATENT OFFICE
CERTIFICATE OF CORRECTION

Patent No. 3,660,398           Dated May 2, 1972

Inventor(s) Kurt Ley et al

It is certified that error appears in the above-identified patent and that said Letters Patent are hereby corrected as shown below:

Col. 41, line 66 (in the diagram)

"(R)" should be -- $(R)_X$ --.

Col. 45, Table (last structural formula)

"$C_{10}H_2$" should be -- $C_{10}H_{21}$ --.

Col. 47, Table (last structural formula)

" $-N-$ " should be -- $-N-$ --.
$\quad\quad\|$ $\quad\quad\quad\quad\quad\quad\quad\quad\quad$ $|$
$\quad CH_3$ $\quad\quad\quad\quad\quad\quad\quad\quad\quad$ $CH_3$ Col. 49, line 45

"see" should be -- can be seen from the --.

Signed and sealed this 27th day of March 1973.

(SEAL)
Attest:

EDWARD M. FLETCHER, JR.           ROBERT GOTTSCHALK
Attesting Officer                 Commissioner of Patents